US012619967B2

(12) United States Patent
Uzaki

(10) Patent No.: US 12,619,967 B2
(45) Date of Patent: May 5, 2026

(54) CONTENT DELIVERY APPARATUS, CONTENT DELIVERY METHOD, AND CONTENT DELIVERY PROGRAM

(71) Applicant: JVCKENWOOD CORPORATION, Yokohama (JP)

(72) Inventor: Jiro Uzaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/892,207

(22) Filed: Sep. 20, 2024

(65) Prior Publication Data

US 2025/0016393 A1      Jan. 9, 2025

Related U.S. Application Data

(63) Continuation of application No. PCT/JP2023/009753, filed on Mar. 14, 2023.

(30) Foreign Application Priority Data

Mar. 22, 2022    (JP) ................................. 2022-045848
Mar. 22, 2022    (JP) ................................. 2022-045849

(Continued)

(51) Int. Cl.
*H04N 21/2543*        (2011.01)
*G06F 21/10*        (2013.01)
(Continued)

(52) U.S. Cl.
CPC ......... *G06Q 20/1235* (2013.01); *G06F 21/10* (2013.01); *G06Q 20/389* (2013.01); *H04N 21/2543* (2013.01); *G06Q 2220/10* (2013.01)

(58) Field of Classification Search
CPC ............ G06Q 20/1235; G06Q 20/389; G06Q 2220/10; G06Q 30/06; G06Q 50/10;
(Continued)

(56) References Cited

U.S. PATENT DOCUMENTS 7,734,601 B2 *   6/2010   Weber ..................... G06F 16/44
                                                            707/948
8,364,548 B2 *   1/2013   Jouret ..................... G06F 21/10
                                                            705/26.25
(Continued)

FOREIGN PATENT DOCUMENTS

JP          2002199332 A      7/2002
JP          2003331195 A      11/2003
(Continued)

OTHER PUBLICATIONS

European Search Report issued on Mar. 13, 2025, for application No. EP23774662.3.
(Continued)

*Primary Examiner* — Sahar Aqil Riaz
(74) *Attorney, Agent, or Firm* — Nath, Goldberg & Meyer; Jerald L. Meyer

(57)        ABSTRACT

A content acquisition unit extracts a divided block having an evaluation value equal to or more than a threshold value from among content in which each of divided blocks is associated with an evaluation value and is managed by a content asset management apparatus, and acquires the extracted divided block as delivery data. When a user pays a usage fee to receive the delivery of the extracted divided block, a delivery control unit performs control to deliver the delivery data to a user terminal of the user.

6 Claims, 29 Drawing Sheets

(30) Foreign Application Priority Data

| | | | |
|---|---|---|---|
| Mar. 22, 2022 | (JP) | .................................. | 2022-045850 |
| Mar. 22, 2022 | (JP) | .................................. | 2022-045851 |
| Mar. 22, 2022 | (JP) | .................................. | 2022-045852 |
| Mar. 22, 2022 | (JP) | .................................. | 2022-045853 |
| Mar. 22, 2022 | (JP) | .................................. | 2022-045854 |
| Mar. 22, 2022 | (JP) | .................................. | 2022-045855 |
| Mar. 22, 2022 | (JP) | .................................. | 2022-045856 |
| Mar. 22, 2022 | (JP) | .................................. | 2022-045857 |

(51) Int. Cl.

*G06Q 20/12*      (2012.01)
*G06Q 20/38*      (2012.01)

(58) Field of Classification Search

CPC ...... G06Q 50/18; G06Q 50/184; G06F 21/10;
H04N 21/2543; H04N 21/25435; H04N
21/8113; H04N 21/8456; H04N
21/23418; H04N 21/845; G10G 1/00;
G10K 15/02
USPC ............................................................ 725/5
See application file for complete search history.

(56) References Cited

U.S. PATENT DOCUMENTS

| | | | | | |
|---|---|---|---|---|---|
| 8,639,625 | B1* | 1/2014 | Ginter | ...................... | G06F 21/78 |
| | | | | | 705/50 |
| 11,853,402 | B2* | 12/2023 | Park | ...................... | H04N 19/154 |
| 2003/0018491 | A1* | 1/2003 | Nakahara | ............. | G06Q 20/382 |
| | | | | | 348/E7.06 |
| 2008/0208668 | A1* | 8/2008 | Heller | ...................... | G06Q 30/02 |
| | | | | | 705/7.12 |
| 2008/0243851 | A1* | 10/2008 | Vrielink | .................. | G06F 21/10 |
| | | | | | 707/999.009 |
| 2010/0125511 | A1* | 5/2010 | Jouret | ...................... | G06Q 30/08 |
| | | | | | 705/26.1 |
| 2011/0295787 | A1* | 12/2011 | Tateno | .................. | G06F 40/237 |
| | | | | | 706/46 |
| 2014/0237521 | A1* | 8/2014 | Rothschild | ......... | H04N 21/8456 |
| | | | | | 725/88 |
| 2015/0341410 | A1* | 11/2015 | Schrempp | ............. | H04L 65/762 |
| | | | | | 709/231 |
| 2019/0028278 | A1* | 1/2019 | Gilson | .................. | H04L 9/3239 |
| 2019/0260879 | A1* | 8/2019 | Raleigh | ................. | H04M 15/83 |
| 2020/0210550 | A1* | 7/2020 | Park | ........................ | G06F 21/44 |
| 2021/0248214 | A1 | 8/2021 | Goldston et al. | | |
| 2021/0258624 | A1* | 8/2021 | Garfinkel | ........... | H04N 21/2542 |
| 2021/0279305 | A1* | 9/2021 | Goldston | ................ | G06F 16/41 |
| 2024/0126842 | A1* | 4/2024 | Stappenbeck | .......... | H04L 63/10 |

FOREIGN PATENT DOCUMENTS

| | | | |
|---|---|---|---|
| JP | 2004-29859 | A | 1/2004 |
| JP | 2004-70646 | A | 3/2004 |
| JP | 2005122646 | A | 5/2005 |
| JP | 2007305054 | A | 11/2007 |
| JP | 2007534053 | A | 11/2007 |
| JP | 2009026332 | A | 2/2009 |
| JP | 2009038420 | A | 2/2009 |
| JP | 2009237688 | A | 10/2009 |
| JP | 2009258774 | A | 11/2009 |
| JP | 2009-294778 | A | 12/2009 |
| JP | 2011248831 | A | 12/2011 |
| JP | 2012508420 | A | 4/2012 |
| JP | 2013-157820 | A | 8/2013 |
| JP | 2021189475 | A | 12/2021 |
| JP | 2021535455 | A | 12/2021 |
| KR | 102333342 | B1 | 12/2021 |
| WO | 2019004118 | A1 | 1/2019 |

OTHER PUBLICATIONS

European Search Report issued on Mar. 13, 2025, for application No. EP23774662.

* cited by examiner

FIG. 2

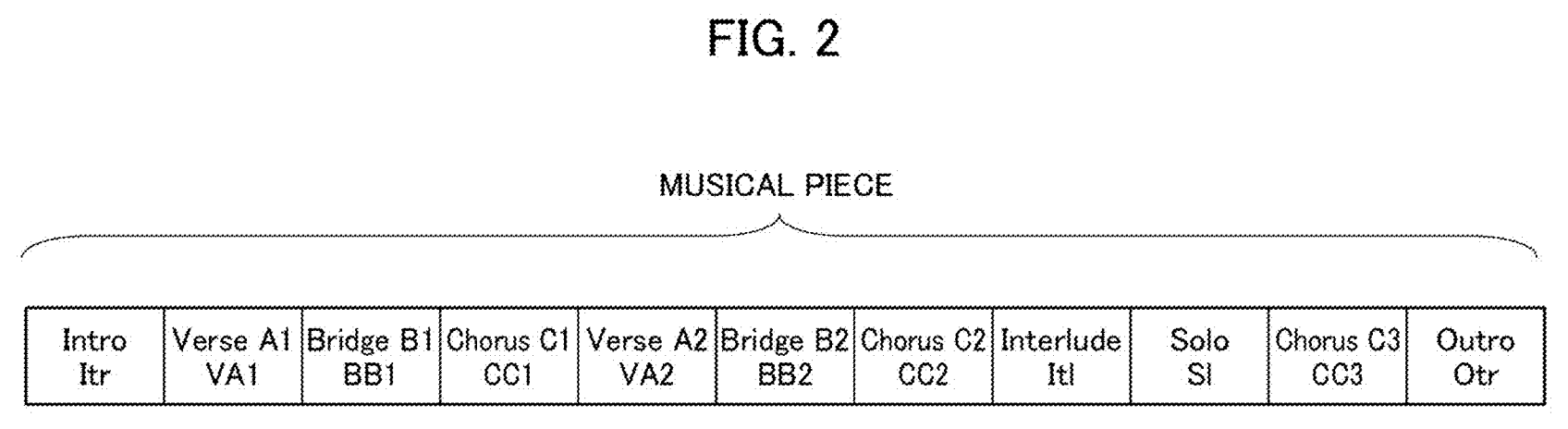

MUSICAL PIECE

| Intro<br>Itr | Verse A1<br>VA1 | Bridge B1<br>BB1 | Chorus C1<br>CC1 | Verse A2<br>VA2 | Bridge B2<br>BB2 | Chorus C2<br>CC2 | Interlude<br>Itl | Solo<br>SI | Chorus C3<br>CC3 | Outro<br>Otr |
|---|---|---|---|---|---|---|---|---|---|---|

FIG. 3

| CONTENT INFORMATION | | |
|---|---|---|
| MUSICAL PIECE NAME | CREATOR | |
| ...... | ...... | |
| BLOCK MANAGEMENT CODE | RIGHTS HOLDER | EVALUATION VALUE |
| Itr | ...... | ...... |
| VA1 | ...... | ...... |
| BB1 | ...... | ...... |
| CC1 | ...... | ...... |
| VA2 | ...... | ...... |
| BB2 | ...... | ...... |
| CC2 | ...... | ...... |
| Itl | ...... | ...... |
| SI | ...... | ...... |
| CC3 | ...... | ...... |
| Otr | ...... | ...... |

FIG. 4

| CONTENT INFORMATION | |
|---|---|
| MUSICAL PIECE NAME | CREATOR |
| ...... | ...... |
| BLOCK MANAGEMENT CODE | EVALUATOR |
| Itr | ......<br>......<br>...... |
| VA1 | ......<br>......<br>...... |
| CC1 | ......<br>......<br>......<br>......<br>......<br>......<br>...... |

MUSICAL PIECE

DIVIDED BLOCK

| | |
|---|---|
| Intro | 82 |
| Verse A1 | 32 |
| Bridge B1 | 41 |
| Chorus C1 | 80 |
| Verse A2 | 49 |
| Bridge B2 | 92 |
| Chorus C2 | 213 |
| Interlude | 26 |
| Solo | 38 |
| Chorus C3 | 188 |
| Outro | 85 |
| SUM | 926 |

FIG. 7

| CONTENT INFORMATION | | |
|---|---|---|
| MUSICAL PIECE NAME | CREATOR | |
| ...... | ...... | |
| BLOCK MANAGEMENT CODE | RIGHTS HOLDER | EVALUATION VALUE |
| Itr | | |
| VA1 | | |
| BB1 | | |
| CC1 | | |
| VA2 | | |
| BB2 | | |
| CC2 | | |
| Itl | | |
| Sl | | |
| CC3 | | |
| Otr | | |

FIG. 9

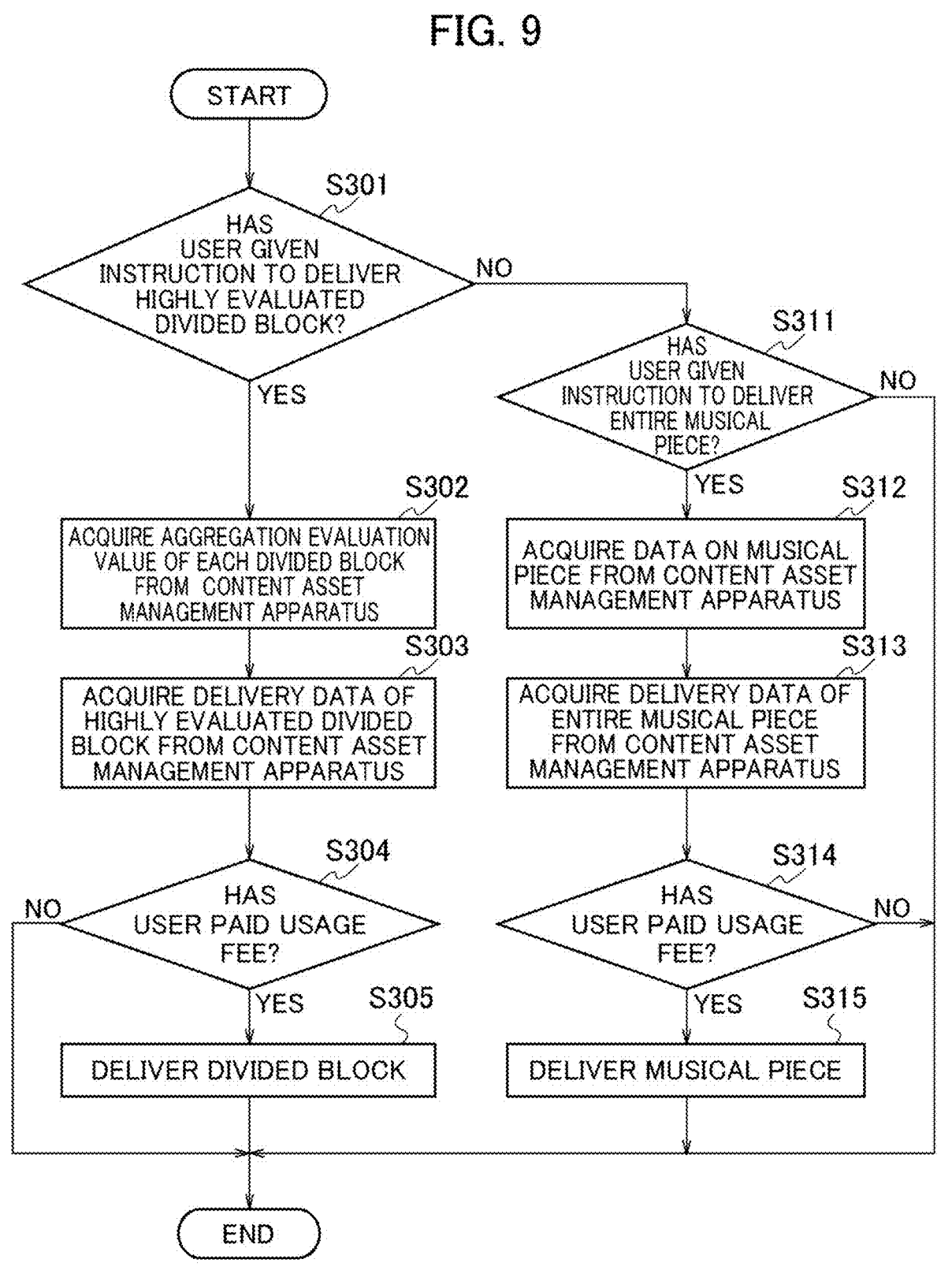

START

S301
HAS USER GIVEN INSTRUCTION TO DELIVER HIGHLY EVALUATED DIVIDED BLOCK?
NO →
YES ↓

S311
HAS USER GIVEN INSTRUCTION TO DELIVER ENTIRE MUSICAL PIECE?
NO →
YES ↓

S302
ACQUIRE AGGREGATION EVALUATION VALUE OF EACH DIVIDED BLOCK FROM CONTENT ASSET MANAGEMENT APPARATUS

S312
ACQUIRE DATA ON MUSICAL PIECE FROM CONTENT ASSET MANAGEMENT APPARATUS

S303
ACQUIRE DELIVERY DATA OF HIGHLY EVALUATED DIVIDED BLOCK FROM CONTENT ASSET MANAGEMENT APPARATUS

S313
ACQUIRE DELIVERY DATA OF ENTIRE MUSICAL PIECE FROM CONTENT ASSET MANAGEMENT APPARATUS

S304
HAS USER PAID USAGE FEE?
NO
YES ↓

S314
HAS USER PAID USAGE FEE?
NO
YES ↓

S305
DELIVER DIVIDED BLOCK

S315
DELIVER MUSICAL PIECE

END

FIG. 10

| MUSICAL PIECE DIVIDED BLOCK | | SPRING | SUMMER | AUTUMN | WINTER | MORNING | MORNING | REGION R1 | REGION R2 |
|---|---|---|---|---|---|---|---|---|---|
| Intro | 82 | 19 | 22 | 21 | 20 | 40 | 42 | 38 | 44 |
| Verse A1 | 32 | 7 | 9 | 8 | 8 | 16 | 16 | 14 | 18 |
| Bridge B1 | 41 | 10 | 9 | 11 | 11 | 21 | 20 | 19 | 22 |
| Chorus C1 | 80 | 20 | 20 | 22 | 18 | 46 | 34 | 39 | 41 |
| Verse A2 | 49 | 14 | 13 | 12 | 10 | 22 | 27 | 26 | 23 |
| Bridge B2 | 92 | 23 | 26 | 23 | 20 | 44 | 48 | 46 | 46 |
| Chorus C2 | 213 | 48 | 50 | 62 | 53 | 112 | 101 | 116 | 97 |
| Interlude | 26 | 8 | 6 | 6 | 6 | 12 | 14 | 13 | 13 |
| Solo | 38 | 8 | 10 | 12 | 8 | 18 | 20 | 20 | 18 |
| Chorus C3 | 188 | 40 | 56 | 48 | 44 | 90 | 98 | 71 | 117 |
| Outro | 85 | 21 | 22 | 23 | 19 | 45 | 40 | 44 | 41 |
| SUM | 926 | 218 | 243 | 248 | 217 | 466 | 460 | 446 | 480 |

| CONTENT INFORMATION | | |
|---|---|---|
| MUSICAL PIECE NAME | | CREATOR |
| ·····. | | ·····. |
| BLOCK MANAGEMENT CODE | RIGHTS HOLDER | AVAILABILITY OF DELIVERY |
| Itr | ·····. | PERMITTED |
| VA1 | ·····. | PERMITTED |
| BB1 | ·····. | PERMITTED |
| CC1 | ·····. | PERMITTED |
| VA2 | ·····. | PERMITTED |
| BB2 | ·····. | PERMITTED |
| CC2 | ·····. | NOT PERMITTED |
| Itl | ·····. | PERMITTED |
| Sl | ·····. | PERMITTED |
| CC3 | ·····. | PERMITTED |
| Otr | ·····. | PERMITTED |

FIG. 18

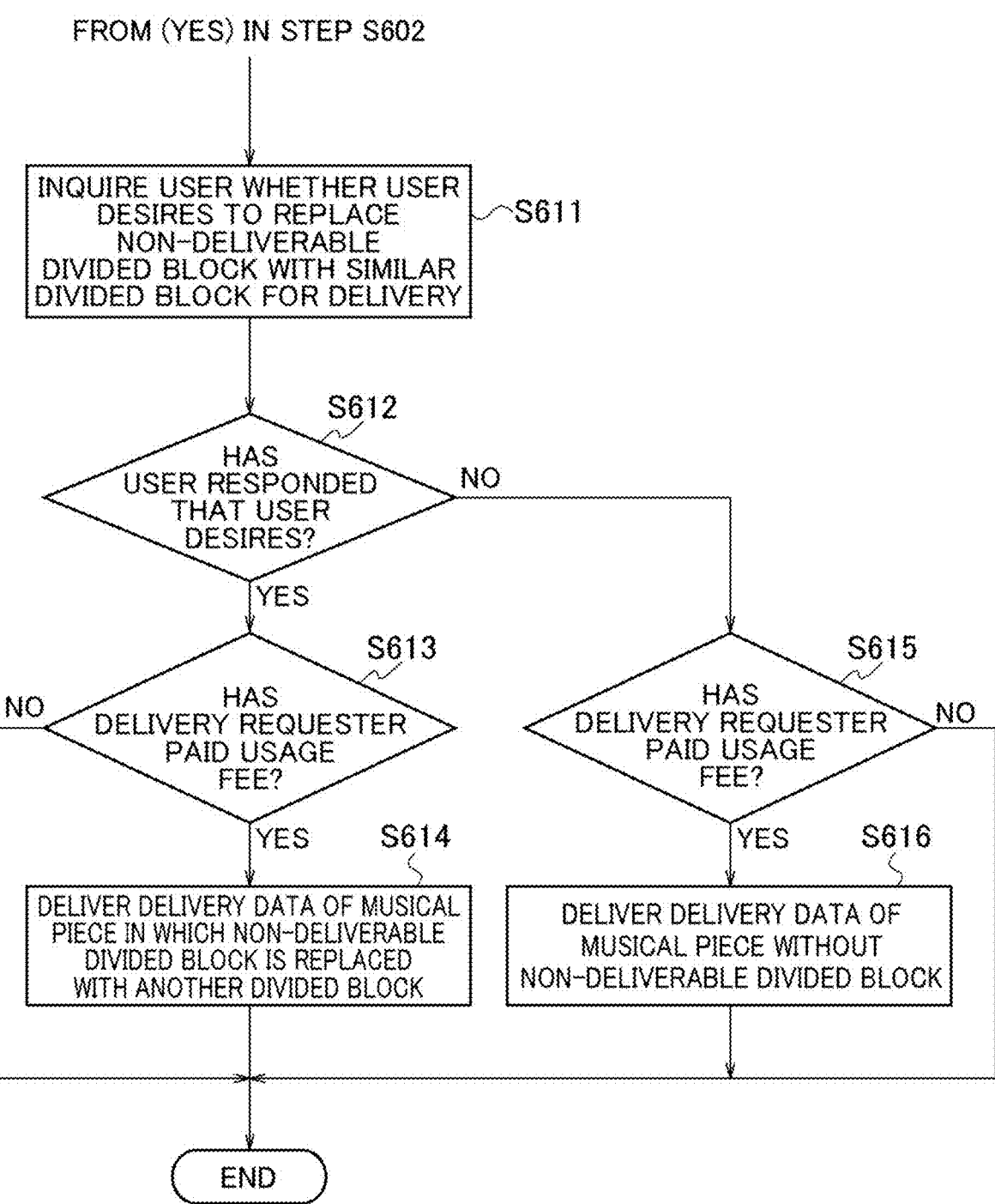

FROM (YES) IN STEP S602

INQUIRE USER WHETHER USER DESIRES TO REPLACE NON-DELIVERABLE DIVIDED BLOCK WITH SIMILAR DIVIDED BLOCK FOR DELIVERY — S611

S612
HAS USER RESPONDED THAT USER DESIRES?

NO

YES

S613
HAS DELIVERY REQUESTER PAID USAGE FEE?

NO

YES          S614

DELIVER DELIVERY DATA OF MUSICAL PIECE IN WHICH NON-DELIVERABLE DIVIDED BLOCK IS REPLACED WITH ANOTHER DIVIDED BLOCK

S615
HAS DELIVERY REQUESTER PAID USAGE FEE?

NO

YES          S616

DELIVER DELIVERY DATA OF MUSICAL PIECE WITHOUT NON-DELIVERABLE DIVIDED BLOCK

END

FIG. 19

| CONTENT INFORMATION | | |
|---|---|---|
| MUSICAL PIECE NAME | | CREATOR |
| ...... | | ...... |
| BLOCK MANAGEMENT CODE | RIGHTS HOLDER | AVAILABILITY OF COMBINATION WITH OTHER DIVIDED BLOCKS |
| Itr | ...... | PERMITTED |
| VA1 | ...... | PERMITTED |
| BB1 | ...... | PERMITTED |
| CC1 | ...... | PERMITTED |
| VA2 | ...... | PERMITTED |
| BB2 | ...... | PERMITTED |
| CC2 | ...... | PERMITTED |
| Itl | ...... | PERMITTED |
| Sl | ...... | PERMITTED |
| CC3 | ...... | NOT PERMITTED |
| Otr | ...... | PERMITTED |

FIG. 22

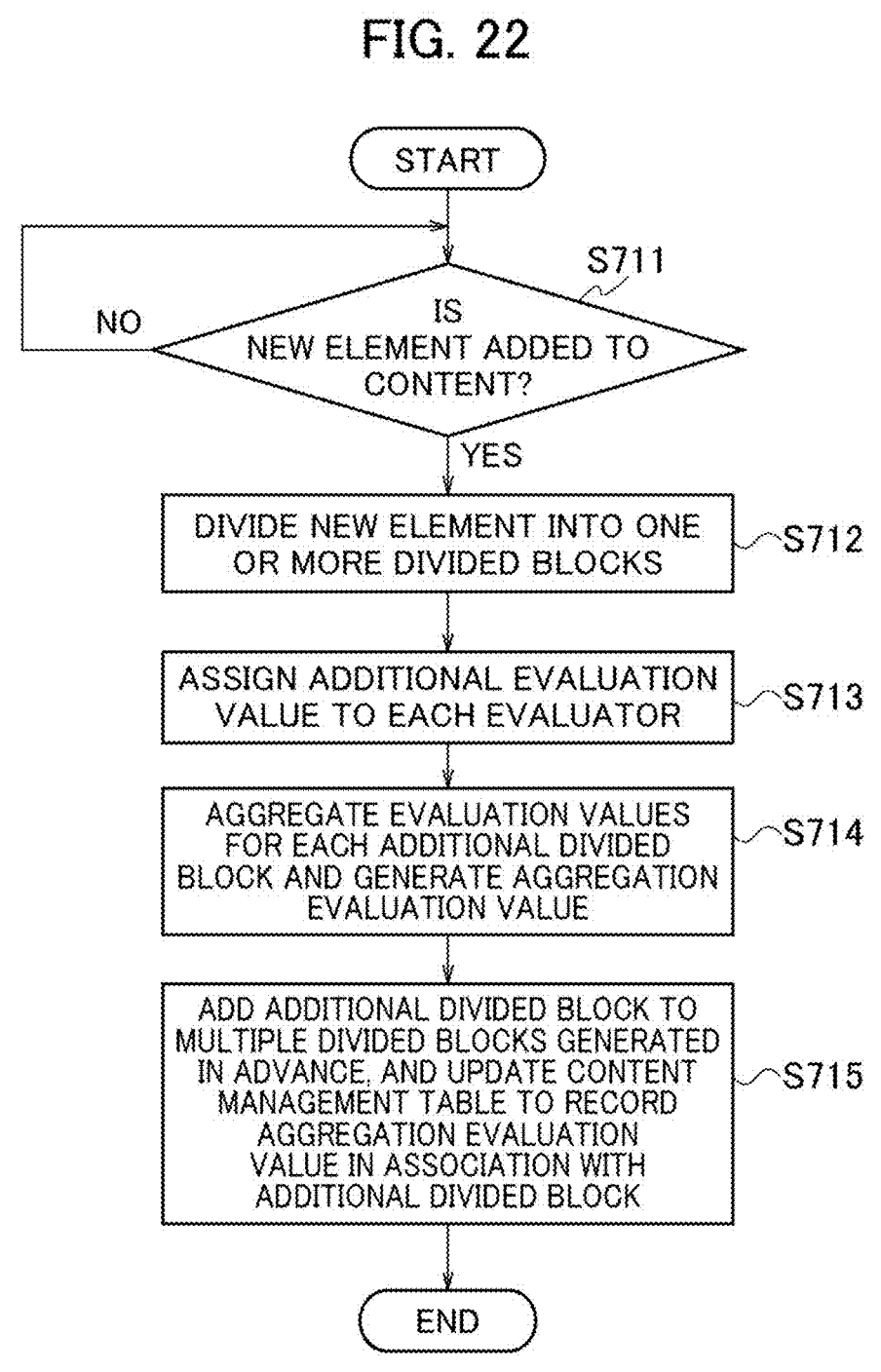

START

S711
IS
NEW ELEMENT ADDED TO
CONTENT?

NO

YES

DIVIDE NEW ELEMENT INTO ONE
OR MORE DIVIDED BLOCKS ⟋S712

ASSIGN ADDITIONAL EVALUATION
VALUE TO EACH EVALUATOR ⟋S713

AGGREGATE EVALUATION VALUES
FOR EACH ADDITIONAL DIVIDED
BLOCK AND GENERATE AGGREGATION
EVALUATION VALUE ⟋S714

ADD ADDITIONAL DIVIDED BLOCK TO
MULTIPLE DIVIDED BLOCKS GENERATED
IN ADVANCE, AND UPDATE CONTENT
MANAGEMENT TABLE TO RECORD
AGGREGATION EVALUATION
VALUE IN ASSOCIATION WITH
ADDITIONAL DIVIDED BLOCK ⟋S715

END

FIG. 25

| CONTENT INFORMATION | | | |
|---|---|---|---|
| MUSICAL PIECE NAME | CREATOR | | |
| ...... | ...... | | |
| BLOCK MANAGEMENT CODE | RIGHTS HOLDER | AGENT | EVALUATION VALUE |
| Itr | ...... | ...... | ...... |
| VA1 | ...... | ...... | ...... |
| BB1 | ...... | ...... | ...... |
| CC1 | ...... | ...... | ...... |
| VA2 | ...... | ...... | ...... |
| BB2 | ...... | ...... | ...... |
| CC2 | ...... | ...... | ...... |
| Itl | ...... | ...... | ...... |
| Sl | ...... | ...... | ...... |
| CC3 | ...... | ...... | ...... |
| Otr | ...... | ...... | ...... |

CONTENT DELIVERY APPARATUS, CONTENT DELIVERY METHOD, AND CONTENT DELIVERY PROGRAM

CROSS-REFERENCE TO RELATED APPLICATIONS

This application is a continuation of PCT Application No. PCT/JP2023/009753, filed on Mar. 14, 2023, and claims the priority of Japanese Patent Applications No. 2022-045848, No. 2022-045849, No. 2022-045850, No. 2022-045851, No. 2022-045852, No. 2022-045853, No. 2022-045854, No. 2022-045855, No. 2022-045856, and No. 2022-045857, filed on Mar. 22, 2022, the entire contents of all of which are incorporated herein by reference.

BACKGROUND

The present disclosure relates to a content delivery apparatus, a content delivery method, and a content delivery program.

Assuming that a musical piece is an example of content, when a lyricist and a musical composer create a musical piece, the lyricist and the musical composer are authors of the musical piece and hold copyright thereof. The content may be divided into a plurality of blocks, and proprietary rights (right of copyrighted work) that are a part of the copyright may be assigned to a third party by a contract for each of the plurality of blocks. Further, if the content is not a copyrighted work, or even if the content is a copyrighted work, when the author holds part or all of the copyright (right of copyrighted work), property rights of divided blocks of the content, or a legal status equivalent to the property rights (certain proprietary rights), may be assigned to a third party.

SUMMARY

There are demands for a content asset management apparatus, a content asset management method, and a content asset management program, or a content delivery apparatus, a content delivery method, and a content delivery program, which are suitable when content is divided into a plurality of divided blocks and a rights holder is set for each of the divided blocks.

A first aspect of one or more embodiments provides a content delivery apparatus including: a content acquisition unit configured to: when an instruction to deliver a divided block having an evaluation value equal to or more than a predetermined threshold value is received from a user, extract, from a content asset management apparatus, one or more divided blocks having evaluation values equal to or more than the threshold value from among content in which each divided block, from a plurality of divided blocks obtained by dividing the content into a plurality of blocks, is associated with an evaluation value and is managed by the content asset management apparatus, and acquire the extracted divided blocks as delivery data; and a delivery control unit configured to, when the user pays a usage fee to receive the delivery of the extracted divided blocks, perform control to deliver the delivery data to a user terminal of the user.

A second aspect of one or more embodiments provides a content delivery apparatus including: a data acquisition unit configured to, when an instruction to deliver content is received from a user, acquire data indicating whether the delivery is possible for each divided block, from a plurality of divided blocks obtained by dividing the content into a plurality of blocks, from a content asset management apparatus that manages the content; a notification unit configured to, when the content includes a divided block which is not deliverable, notify the user that the content includes the divided block which is not deliverable and inquires the user whether the user allows to receive delivery of content without the divided block which is not deliverable; a content acquisition unit configured to acquire delivery data of a divided block without the divided block which is not deliverable from the content asset management apparatus; and a delivery control unit configured to perform control to deliver the delivery data acquired by the content acquisition unit to a user terminal of the user, when the user responds to the notification unit that the user allows to receive delivery of the content without the divided block which is not deliverable and the user pays a usage fee for receiving the delivery of the content.

A third aspect of one or more embodiments provides a content delivery apparatus including: a data acquisition unit configured to, when an instruction to deliver combination content is received from a user, the combination content being obtained by combining two or more divided blocks of a plurality of divided blocks obtained by dividing the content into a plurality of blocks, acquire data indicating whether to permit combination with other divided blocks for each of the divided blocks from a content asset management apparatus that manages the content; a content acquisition unit configured to acquire delivery data of the divided blocks of the combination content from the content asset management apparatus; and a delivery control unit configured to perform control to deliver the delivery data acquired by the content acquisition unit to a user terminal of the user, when all of the divided blocks included in the combination content are permitted to be combined with other divided blocks and the user pays a usage fee for receiving delivery of the combination content.

A fourth aspect of one or more embodiments provides a content delivery method including: extracting, using a computer functioning as a content delivery server, from a content asset management apparatus, one or more divided blocks having evaluation values equal to or more than a predetermined threshold value and acquiring the extracted divided blocks as delivery data, when an instruction to deliver a divided block having an evaluation value equal to or more than the threshold value is received from a user, the divided blocks being among content in which each divided block, from a plurality of divided blocks obtained by dividing the content into a plurality of blocks, is associated with an evaluation value and is managed by the content asset management apparatus; and performing control to deliver the delivery data to a user terminal of the user, using the computer, when the user pays a usage fee to receive the delivery of the extracted divided blocks.

A fifth aspect of one or more embodiments provides a content delivery method including: acquiring data, using a computer functioning as a content delivery server, indicating whether a delivery is possible for each divided block of a plurality of divided blocks obtained by dividing content into a plurality of blocks from a content asset management apparatus that manages the content, when an instruction to deliver the content is received from a user; notifying the user, using the computer, that, when the content includes a divided block which is not deliverable, the content includes the divided block which is not deliverable and inquiring the user whether the user allows to receive delivery of content without the divided block which is not deliverable; acquiring, using the computer, delivery data of a divided block without the divided block which is not deliverable from the content asset management apparatus; and performing control, using the computer, to deliver the acquired delivery data to a user terminal of the user, when the user responds that the user allows to receive delivery of the content without the divided block which is not deliverable, and the user pays a usage fee for receiving the delivery of the content.

BRIEF DESCRIPTION OF THE DRAWINGS

FIG. 2 is a diagram illustrating an example of a musical piece divided into a plurality of divided blocks.

FIG. 3 is a diagram illustrating an example of a content management table managed by a content asset management apparatus.

FIG. 4 is a diagram illustrating an example of an evaluator management table managed by a content asset management apparatus.

FIG. 7 is a diagram illustrating a content management table which is created by a content asset management apparatus according to a second embodiment and which does not record a rights holder and an evaluation value of each divided block.

FIG. 9 is a flowchart illustrating an operation performed by a content delivery apparatus according to a third embodiment, a content delivery method according to a third embodiment, and processing that a content delivery program according to a third embodiment causes a computer to perform.

FIG. 10 is a diagram illustrating examples of aggregation evaluation values obtained by individually aggregating evaluation values for each divided block, for each season, for each time of day, and for each location.

FIG. 14 is a diagram illustrating a method of setting a rights holder of content managed by a content asset management apparatus in a fourth embodiment.

FIG. 16 is a diagram illustrating an example of a content management table to which the availability of the delivery indicating whether a rights holder permits delivery is set for each divided block.

FIG. 18 is a flowchart illustrating an operation performed by a content delivery apparatus according to a sixth embodiment, a content delivery method according to a sixth embodiment, and partial processing that a content delivery program according to a sixth embodiment causes a computer to perform when content including a divided block which is not deliverable is delivered, which is different from that is FIG. 17.

FIG. 19 is a diagram illustrating an example of a content management table to which the availability of combination indicating whether a rights holder permits combination with other divided blocks is set for each divided block.

FIG. 22 is a flowchart illustrating an operation performed by the content asset management apparatus according to a seventh embodiment, a content asset management method according to a seventh embodiment, and processing that the content asset management program according to a seventh embodiment causes a computer to perform when a new element is added to content.

FIG. 25 is a diagram illustrating an example of a content management table which records, for each divided block, a rights holder, an agent representing a rights holder, and an evaluation value in association.

DETAILED DESCRIPTION

A description will be given below with reference to the accompanying diagrams regarding a content asset management apparatus, a content asset management method, and a content asset management program, or a content delivery apparatus, a content delivery method, and a content delivery program according to each embodiment.

Figure 1:
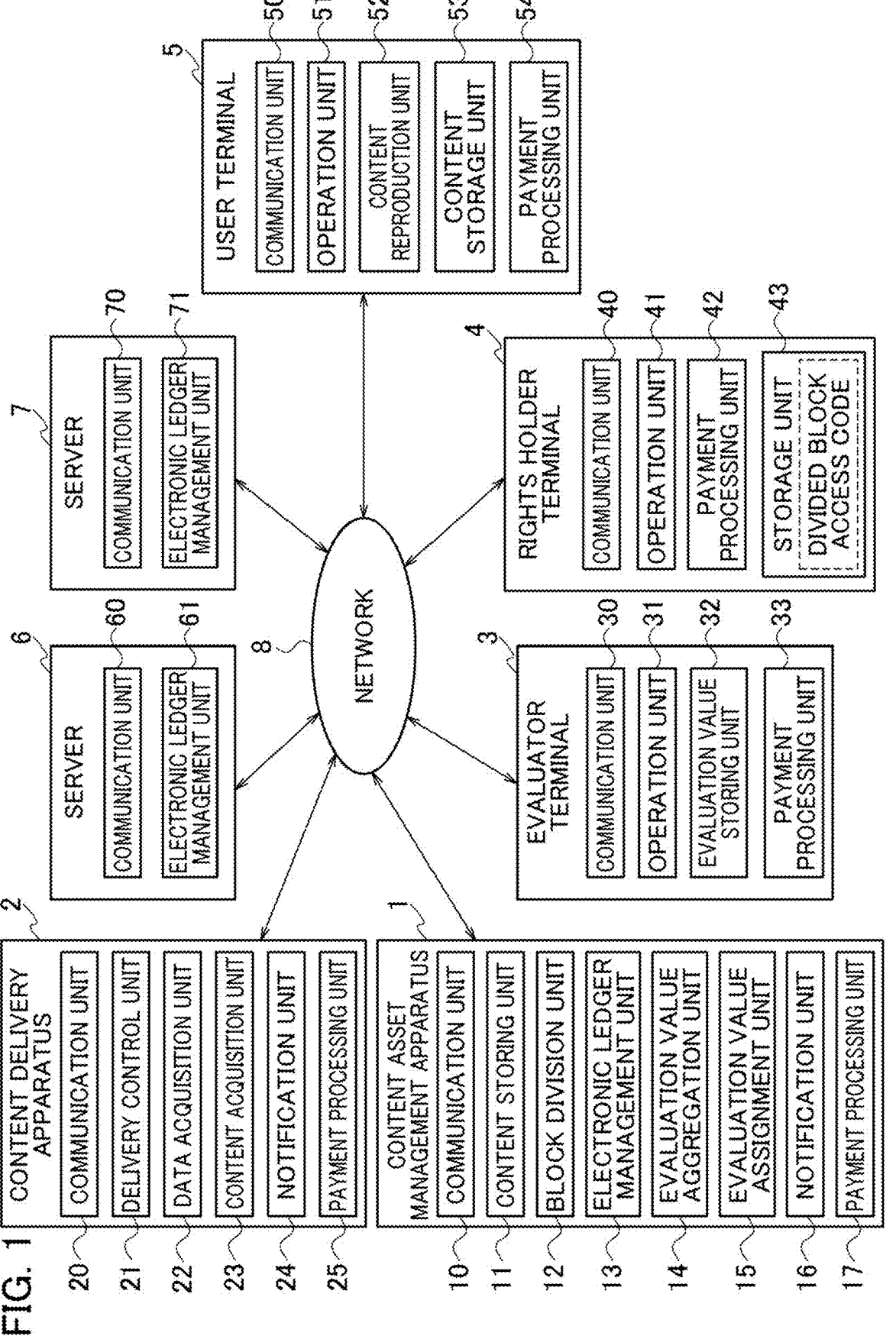
FIG. 1 is a block diagram showing a configuration example of an entire content delivery system including a content asset management apparatus and a content delivery apparatus.

First, a description will be given with reference to FIGS. 1 to 4 regarding a configuration example of an entire content delivery system including a content asset management apparatus and a content delivery apparatus. As shown in FIG. 1, the content delivery system includes a content asset management apparatus 1, a content delivery apparatus 2, an evaluator terminal 3, a rights holder terminal 4, a user terminal 5, and servers 6 and 7, all of which are connected to a network 8. The number of each of the evaluator terminal 3, the rights holder terminal 4, and the user terminal 5 may be two or more. A server having the same configuration as the servers 6 and 7 may be further connected to the network 8. The servers 6 and 7 are external servers located at external positions of the content asset management apparatus 1.

The content asset management apparatus 1 includes a communication unit 10, a content storing unit 11, a block division unit 12, an electronic ledger management unit 13, an evaluation value aggregation unit 14, an evaluation value assignment unit 15, a notification unit 16, and a payment processing unit 17. The content asset management apparatus 1 may include additional configurations not shown in FIG. 1. The content delivery apparatus 2 includes a communication unit 20, a delivery control unit 21, a data acquisition unit 22, a content acquisition unit 23, a notification unit 24, and a payment processing unit 25.

The evaluator terminal 3 includes a communication unit 30, an operation unit 31, an evaluation value storing unit 32, and a payment processing unit 33. The rights holder terminal 4 includes a communication unit 40, an operation unit 41, a payment processing unit 42, and a storage unit 43. The storage unit 43 stores a divided block access code. The user terminal 5 includes a communication unit 50, an operation unit 51, a content reproduction unit 52, a content storage unit 53, and a payment processing unit 54. The servers 6 and 7 include communication units 60 and 70, and electronic ledger management units 61 and 71, respectively.

The content asset management apparatus 1 may be a content asset management server for managing content assets. The content delivery apparatus 2 may be a content delivery server for delivering content which is managed by the content asset management apparatus 1 and is stored in the content asset management apparatus 1. The content asset management apparatus 1 and the content delivery apparatus 2 may be integrated, and one server may function as the content asset management apparatus 1 and the content delivery apparatus 2.

The content asset management apparatus 1 may be constituted by a computer and a non-transitory storage medium for storing a computer program (content asset management program). Due to the computer executing the content asset management program, the units from the communication unit 10 to the payment processing unit 17 shown in FIG. 1 may be functionally implemented. The content delivery apparatus 2 may be constituted by a computer and a non-transitory storage medium for storing a computer program (content delivery program). Due to the computer executing the content delivery program, the units from the communication unit 20 to the payment processing unit 25 shown in FIG. 1 may be functionally implemented.

First Embodiment

A first embodiment has features in a basic configuration and an operation of the content asset management apparatus 1. The content asset management apparatus 1, the content delivery apparatus 2, the evaluator terminal 3, the rights holder terminal 4, the user terminal 5, and the servers 6 and 7 have the communication units 10, 20, 30, 40, 50, 60, and 70, respectively, and this enables them to communicate with each other via the network 8. Typically, the network 8 is the Internet.

The content storing unit 11 stores one or more pieces of content. The content may be a musical piece, a movie, or a literary work such as a novel. The content is not limited to a copyrighted work, and it is sufficient if the content can be divided into blocks. In a first embodiment, the content is regarded as a musical piece.

The block division unit 12 divides a musical piece stored in the content storing unit 11 into a plurality of blocks. As shown in FIG. 2, the block division unit 12 divides one musical piece into Intro, Verse A1, Bridge B1, Chorus C1, Verse A2, Bridge B2, Chorus C2, Interlude, Solo, Chorus C3, and Outro, for example. The block division unit 12 divides a musical piece into a plurality of blocks, and each block of the plurality of blocks will be referred to as a divided block.

Block management codes for Intro, Verse A1, Bridge B1, Chorus C1, Verse A2, Bridge B2, Chorus C2, Interlude, Solo, Chorus C3, and Outro are Itr, VA1, BB1, CC1, VA2, BB2, CC2, It1, S1, CC3, and Otr, respectively. The block management codes may be numeric strings or mixtures of numeric characters and alphabets.

The block division unit 12 dividing a musical piece into a plurality of blocks does not necessarily mean that the block division unit 12 divides musical piece data into individual pieces of data such as Intro, Verse A1, Bridge B1, Chorus C1, Verse A2, Bridge B2, Chorus C2, Interlude, Solo, Chorus C3, and Outro. The block division unit 12 dividing a musical piece into a plurality of blocks may mean that the electronic ledger management unit 13, described later, manages a musical piece for each divided block, even if the block division unit 12 does not actually divide musical piece data into data for each divided block.

A plurality of evaluators evaluate one or more divided blocks using the evaluator terminal 3. The evaluation value assignment unit 15 assigns the share of an evaluation value to each evaluator in advance, and the evaluation value storing unit 32 of the evaluator terminal 3 stores the share of the evaluation value. An evaluation value indicates the evaluation for each divided block. The evaluation value assignment unit 15 assigns 100 points to each evaluator as the share of an evaluation value, for example. An evaluator selects any one of the divided blocks using the operation unit 31, and allocates a desired evaluation value to the selected divided block from the share of the evaluation value. When an evaluator selects a divided block to which an evaluation value is allocated, it is preferable that a musical piece is reproduced by the evaluator terminal 3.

The property rights of a musical piece itself may be issued as a Non-Fungible Token (NFT), and an evaluation value for each divided block may be associated with the NFT of the musical piece. A plurality of evaluators may be collected by the content asset management apparatus 1 recruiting evaluators for each musical piece, and no limitations are placed on how the plurality of evaluators are collected. Further, the property rights for each divided block may be issued as an NFT, and an evaluation value may be associated with the NFT. In this case, an NFT for each divided block is associated with an original musical piece.

The electronic ledger management unit 13 manages an electronic ledger including a content management table and an evaluator management table. FIG. 3 shows an example of the content management table. The content management table records, as content information, a name of a musical piece, a creator of a musical piece, a block management code of each divided block, and a rights holder of each divided block. An evaluation value is associated with a rights holder for each divided block as further content information. If the rights of any one of the divided blocks have not been transferred from a creator to a third party, the table may record the creator as a rights holder. The rights transfer includes the rights assignment. A rights holder who is an assignee of the rights of any one of the divided blocks may be determined by auction. In this case, the electronic ledger management unit 13 may record the determined time, set the creator to be the rights holder before the recorded time, and set the assignee to be the rights holder at or after the recorded time.

The evaluation value aggregation unit 14 generates an aggregation evaluation value by aggregating evaluation values obtained by a plurality of evaluators evaluating one or more of the plurality of divided blocks for each divided block. The aggregation evaluation value generated by the evaluation value aggregation unit 14 is recorded in evaluation values in the content management table. An aggregation evaluation value of each divided block may indicate an asset value of each divided block, and an aggregation evaluation value of the entire content obtained by summing aggregation evaluation values of all divided blocks may indicate an asset value of the content.

FIG. 4 shows an example of the evaluator management table. The evaluator management table records an evaluator who has evaluated each divided block indicated by a block management code. The evaluator management table may record account information of an evaluator to prevent unauthorized evaluation by the same person. The evaluator management table does not have to include a name and a creator of a musical piece. The content management table shown in FIG. 3, and the evaluator management table shown in FIG. 4, may be configured as one table.

Figure 5:
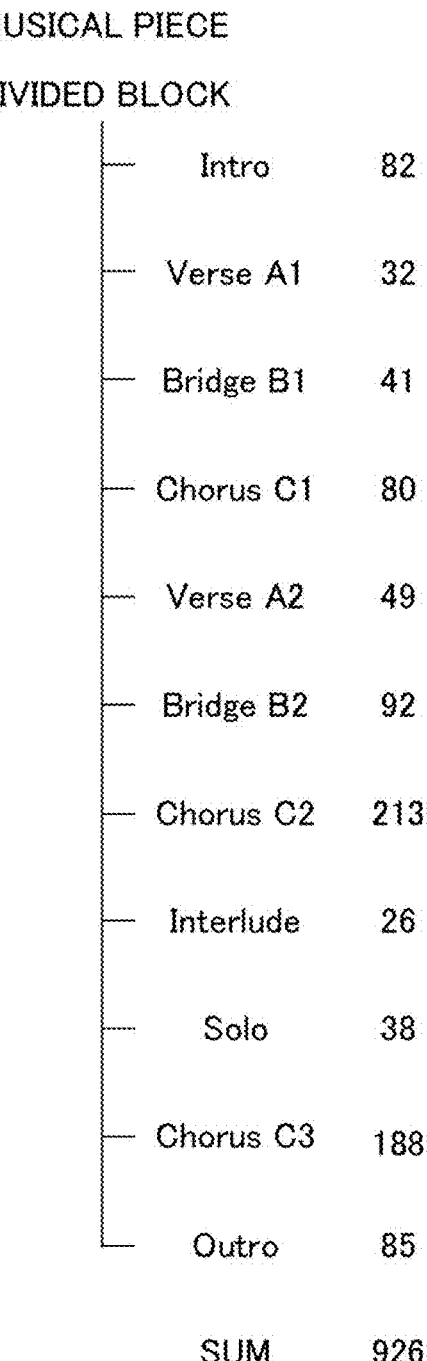
FIG. 5 is a diagram illustrating an example of an aggregation evaluation value obtained by aggregating evaluation values for each divided block.

FIG. 5 shows an example of an aggregation evaluation value obtained by the evaluation value aggregation unit 14 having aggregated evaluation values for each divided block. As described above, an aggregation evaluation value of each divided block is recorded in the content management table as an evaluation value.

A user who intends to use the entire musical piece or any of the divided blocks can request the content delivery apparatus 2 to use the entire musical piece, or any of the divided blocks by operating the operation unit 51 of the user terminal 5. The use of a musical piece includes receiving streaming delivery for reproducing the entire musical piece or any of the divided blocks on the user terminal 5, receiving the provision for downloading the entire musical piece or any of the divided blocks to the user terminal 5, using the entire musical piece or any of the divided blocks for an advertisement, and using the entire musical piece or any of the divided blocks as an insertion song for a drama or the like. The user can refer to an evaluation value for each divided block. A usage fee for each divided block reflects the evaluation value.

The payment processing unit 54 of the user terminal 5 pays, to the content delivery apparatus 2, a usage fee for use of the entire musical piece, or any of the divided blocks by the user operating the operation unit 51. The payment processing unit 25 of the content delivery apparatus 2 receives the usage fee paid by the user. After the payment processing unit 25 receives the usage fee, the content acquisition unit 23 acquires, from the content asset management apparatus 1, the entire musical piece or any of the divided blocks which has been requested by the user and which is stored in the content storing unit 11, as delivery data. The payment of the usage fee is not limited to payment made each time a musical piece or a divided block is used, but may also be payment of a fixed amount on a monthly basis including a subscription service.

The delivery control unit 21 delivers the delivery data acquired by the content acquisition unit 23 to the user terminal 5 via the network 8. The content reproduction unit 52 of the user terminal 5 reproduces the entire musical piece or any of the divided blocks which has been delivered thereto. The content storing unit 53 may download the entire musical piece or any of the divided blocks which has been delivered thereto.

The payment processing unit 25 transmits the usage fee to the payment processing unit 17 of the content asset management apparatus 1 at an appropriate timing.

A user who intends to use the entire musical piece or any of the divided blocks may request the content asset management apparatus 1 to use the entire musical piece or any of the divided blocks by operating the operation unit 51 of the user terminal 5. In this case, the payment processing unit 17 receives a usage fee paid by the user. The content asset management apparatus 1 notifies the content delivery apparatus 2 of information that the content asset management apparatus 1 has received the usage fee, and the delivery control unit 21 delivers the delivery data acquired by the content acquisition unit 23 to the user terminal 5 via the network 8.

Similarly, a plurality of users pay, to the content delivery apparatus 2 (or content asset management apparatus 1), usage fees for using the entire musical piece or any of the divided blocks, and a plurality of user terminals 5 receive the delivery of the entire musical piece or any of the divided blocks. The payment processing unit 17 aggregates the usage fees paid by the users for each divided block. A usage fee for each divided block is recorded in an electronic ledger of an electronic ledger managed by the electronic ledger management unit 13.

The payment processing unit 17 determines the distribution amount based on the aggregated usage fee for each divided block. The payment processing unit 17 may use the aggregated usage fee as the distribution amount without any changes, or may use the amount obtained by subtracting necessary expenses from the aggregated usage fee as the distribution amount. The usage fee when the entire musical piece is used is distributed for all the divided blocks and the fee is added to a usage fee for each divided block. In this case, a usage fee when the entire musical piece is used is preferably distributed according to an aggregation evaluation value of each divided block.

The payment processing unit 17 refers to the content management table and the evaluator management table managed by the electronic ledger management unit 13, and distributes the distribution amount to at least a rights holder and an evaluator of a used divided block. The distribution amount may be equally distributed to evaluators, or the distribution amount may be distributed in consideration of contribution to promotion of a musical piece based on the degree of evaluation or the order of evaluation. In addition, the distribution amount may be distributed only to a rights holder. The payment processing unit 17 refers to a determined time of a rights holder recorded in the electronic ledger management unit 13, and distributes the distribution amount to a creator before the rights transfer (rights assignment) to the rights holder is determined, and to the rights holder to whom the rights have been transferred at or after the determination is made. The distribution amount which has been distributed is also recorded in an electronic ledger managed by the electronic ledger management unit 13.

An operation performed by the content asset management apparatus 1 and a content asset management method performed by the content asset management apparatus 1 will be described with reference to a flowchart shown in FIG. 6. The flowchart shown in FIG. 6 corresponds to processing that the content asset management program stored in the content asset management apparatus 1 causes a computer to perform.

Figure 6:
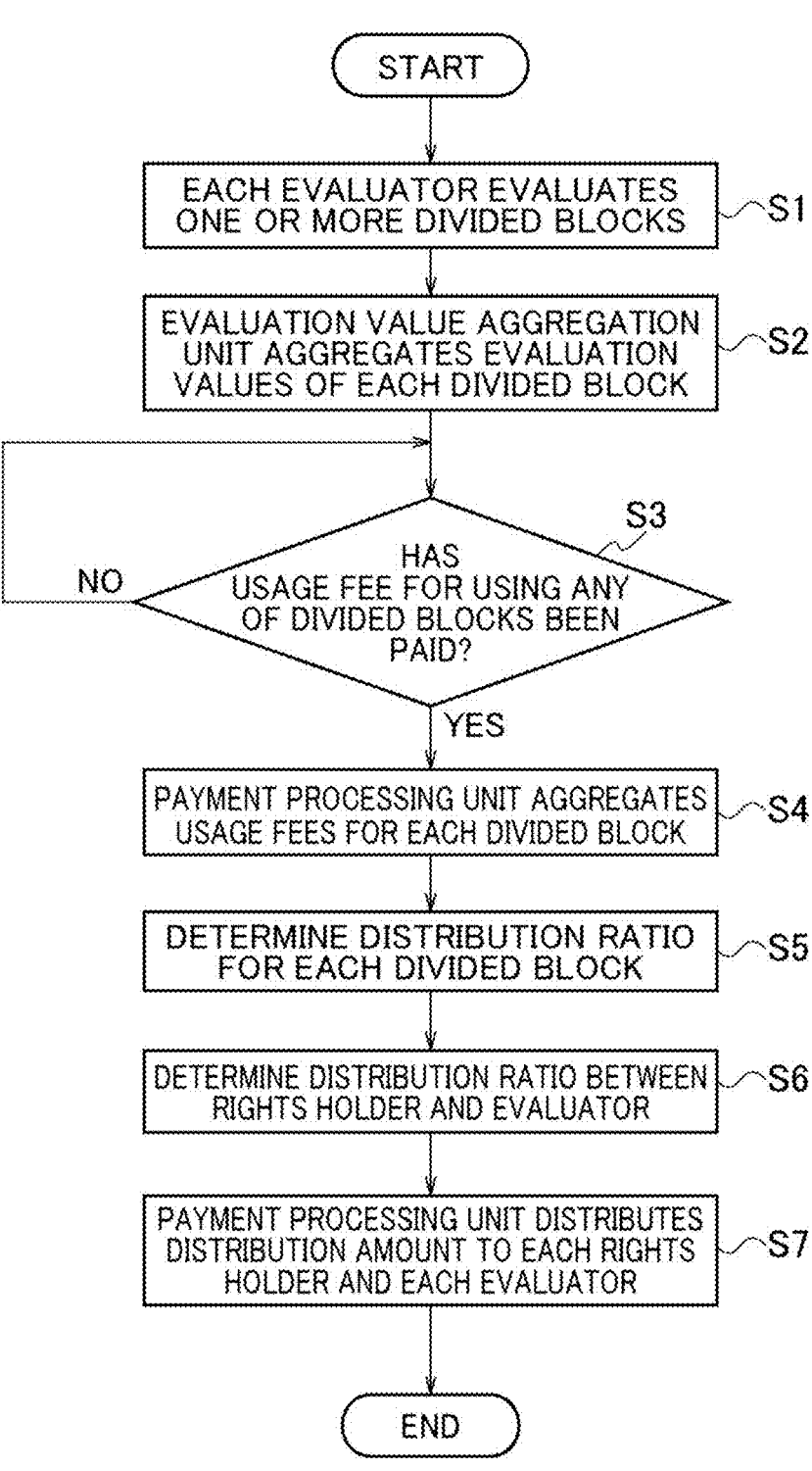
FIG. 6 is a flowchart illustrating an operation performed by a content asset management apparatus according to a first embodiment, a content asset management method according to a first embodiment, and processing that a content asset management program according to a first embodiment causes a computer to perform.

After processing starts in FIG. 6, each evaluator evaluates one or more divided blocks in step S1. Step S1 is processing performed using the evaluator terminal 3. The evaluation value aggregation unit 14 of the content asset management apparatus 1 aggregates evaluation values of each divided block in step S2. The payment processing unit 17 determines whether a usage fee for using any of the divided blocks has been paid in step S3. If the usage fee has not been paid (NO), the payment processing unit 17 repeats the processing in step S3.

If the usage fee has been paid in step S3 (YES), the payment processing unit 17 aggregates usage fees for each divided block in step S4. The usage fees are added and managed. The payment processing unit 17 determines the distribution ratio for each divided block in step S5, and determines the distribution ratio between a rights holder and an evaluator in step S6. The payment processing unit 17 distributes the distribution amount to each rights holder and each evaluator in step S7, and the content asset management apparatus 1 ends the processing. In step S7, the distribution amount based on usage fees summed for each predetermined period may be distributed, or the distribution amount based on usage fees summed at any timing for determining the payment may be distributed.

As described above, a musical piece is divided into a plurality of divided blocks, there is a rights holder for each divided block, and each divided block is evaluated using an evaluation value (aggregation evaluation value). The content asset management apparatus 1 can distribute income from the use of a musical piece to each rights holder and each evaluator by having the configuration and by performing the operation described above.

Incidentally, it is necessary to prevent the falsification of an electronic ledger managed by the electronic ledger management unit 13. It is preferable that an electronic ledger is managed by using a blockchain including the electronic ledger management unit 13 of the content asset management apparatus 1 and the electronic ledger management units 61 and 71 included in the servers 6 and 7, respectively, as shown in FIG. 1.

According to a first embodiment described above, it is possible to perform asset management of the content suitable when the content is divided into a plurality of divided blocks and a rights holder is set for each divided block.

Second Embodiment

A second embodiment has features in a configuration and an operation of a content asset management apparatus 1 when a content storing unit 11 of the content asset management apparatus 1 stores new content. Descriptions of common parts between a second embodiment and a first embodiment may be omitted. When the content storing unit 11 stores the new content, a block division unit 12 divides the stored content into a plurality of blocks and generates a plurality of divided blocks.

If the content is assumed to be a musical piece, as described above, it is preferable that the block division unit 12 divide the musical piece into a plurality of blocks at a position where a melody of the musical piece changes. If the content is a movie, it is preferable that the block division unit 12 divide the movie into a plurality of blocks at each position where a scene changes. If the content is a literary work, the block division unit 12 may divide the literary work by chapters or sections, or in arbitrary units where division is possible, such as one sentence, one word, or one character, for example.

An electronic ledger management unit 13 creates a content management table for recording a rights holder and an evaluation value in association with each for each divided block of a plurality of divided blocks. As shown in FIG. 7, when the content management table is created, a rights holder and an evaluation value of each divided block are not recorded. As described above, a creator may be recorded as a rights holder of each divided block. The electronic ledger management unit 13 manages an electronic ledger including at least the content management table.

An evaluation value assignment unit 15 assigns the share of evaluation values to a plurality of evaluators evaluating one or more divided blocks of the plurality of divided blocks. If an evaluation value storing unit 32 of an evaluator terminal 3 stores the share of the evaluation values assigned, the evaluators can evaluate the divided blocks. When one or more evaluators of the plurality of evaluators evaluate one or more divided blocks, an evaluation value aggregation unit 14 aggregates evaluation values for each divided block and generates an aggregation evaluation value.

The electronic ledger management unit 13 records an aggregation evaluation value generated by the evaluation value aggregation unit 14 for each divided block of the content management table shown in FIG. 7. The content information is managed by using a blockchain, and the history of all division parts may be retained.

An operation performed by the content asset management apparatus 1 and a content asset management method performed by the content asset management apparatus 1 will be described with reference to a flowchart shown in FIG. 8. The flowchart shown in FIG. 8 corresponds to processing that a content asset management program stored in the content asset management apparatus 1 causes a computer to perform.

Figure 8:
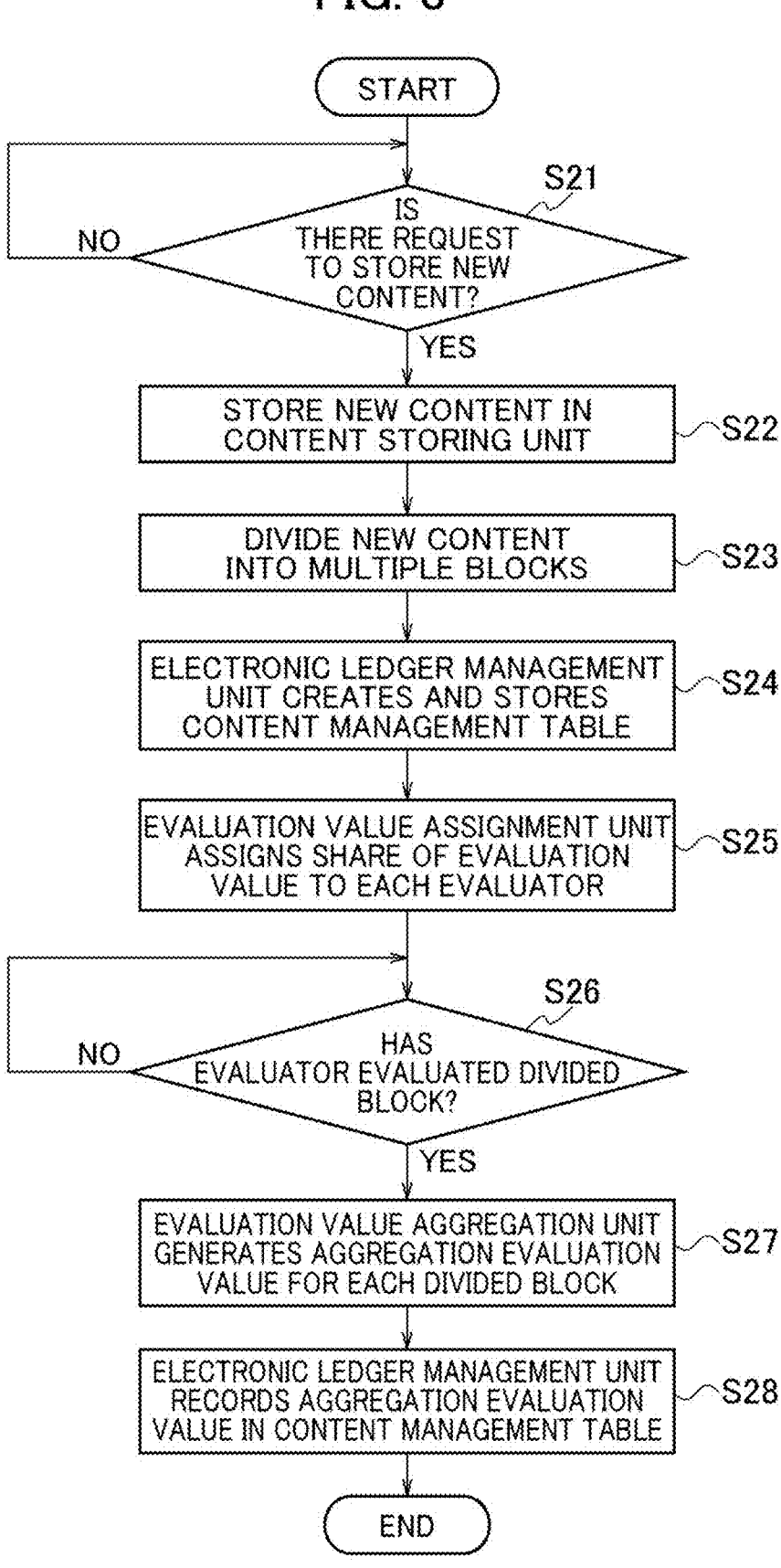
FIG. 8 is a flowchart illustrating an operation performed by the content asset management apparatus according to a second embodiment, a content asset management method according to a second embodiment, and processing that a content asset management program according to a second embodiment causes a computer to perform.

In FIG. 8, after the processing starts, the content storing unit 11 of the content asset management apparatus 1 determines whether there is a request to store new content in step S21. A person who requests to store the new content is a creator of the content, for example. If there is no request to store the new content (NO), the content storing unit 11 repeats the processing of step S21. If there is a request to store the new content (YES), the content storing unit 11 stores the new content in the content storing unit 11 in step S22.

The block division unit 12 divides the new content into a plurality of blocks in step S23. The block division unit 12 may determine how to divide the content depending on a category of the content. The electronic ledger management unit 13 creates and stores the content management table shown in FIG. 7 in step S24. The evaluation value assignment unit 15 assigns the share of evaluation values to a plurality of evaluators in step S25.

The evaluation value aggregation unit 14 determines whether the evaluators evaluate the divided blocks in step S26. If the evaluators do not evaluate the divided blocks (NO), the evaluation value aggregation unit 14 repeats the processing of step S26. Alternatively, if the evaluators evaluate the divided blocks (YES), the evaluation value aggregation unit 14 aggregates evaluation values for each divided block and generates an aggregation evaluation value in step S27. The electronic ledger management unit 13 records an aggregation evaluation value for each divided block in the content management table in step S28, and the content asset management apparatus 1 ends the processing.

As described above, the content asset management apparatus 1 is configured such that the electronic ledger management unit 13 creates a new content management table each time the content storing unit 11 stores new content.

According to a second embodiment described above, when a new rights holder is set for each divided block or an aggregation evaluation value is generated, it is possible to record the information. Therefore, according to a second embodiment, it is possible to perform asset management of the content suitable when the content is divided into a plurality of divided blocks and a rights holder is set for each divided block.

Third Embodiment

A third embodiment has features in a preferred configuration and an operation of a content delivery apparatus 2. Descriptions of common parts between a third embodiment and a first embodiment may be omitted. In a third embodiment, content is assumed to be a musical piece. Suppose that a user uses a user terminal 5 to instruct the content delivery apparatus 2 to deliver a divided block having an evaluation value (aggregation evaluation value) equal to or more than a predetermined threshold value in a certain musical piece. A communication unit 20 acquires the delivery instruction from the user terminal 5.

A data acquisition unit 22 acquires an aggregation evaluation value of each divided block from a content management table of the specified musical piece managed by an electronic ledger management unit 13. The data acquisition unit 22 extracts a block management code of a specified and highly evaluated divided block having an aggregation evaluation value which is equal to or more than the threshold value.

The data acquisition unit 22 may acquire a name of a musical piece. The data acquisition unit 22 may acquire a name of a musical piece and a rights holder of each divided block. The data acquisition unit 22 may acquire a name of a musical piece, a creator, and a rights holder of each divided block.

A content acquisition unit 23 extracts, from a content storing unit 11 of a content asset management apparatus 1, one or more divided blocks corresponding to the extracted block management code of the highly evaluated divided block having the aggregation evaluation value, and acquires delivery data of the extracted divided blocks.

After a user pays a usage fee, a payment processing unit 25 receives the usage fee. The payment processing unit 25 transmits all or part of the received usage fee to the content asset management apparatus 1. Similarly as described above, a payment processing unit 17 of the content asset management apparatus 1 may receive the usage fee and notify the content delivery apparatus 2 that the usage fee has been paid to the content delivery apparatus 2. A delivery control unit 21 performs control to deliver delivery data of the extracted divided block to the user.

The user may use the user terminal 5 to instruct the content delivery apparatus 2 to deliver the whole of a certain musical piece. The data acquisition unit 22 acquires a name of a musical piece from the content management table of the specified musical piece managed by the electronic ledger management unit 13. The data acquisition unit 22 may acquire a name of a musical piece and a creator. The data acquisition unit 22 may acquire a name of a musical piece and a rights holder of each divided block. The data acquisition unit 22 may acquire a name of a musical piece, a creator, and a rights holder of each divided block.

The content acquisition unit 23 acquires delivery data of the entire musical piece from the content storing unit 11 of the content asset management apparatus 1. After the user pays a usage fee for receiving the delivery of the entire musical piece, the payment processing unit 25 receives the usage fee. The payment processing unit 25 transmits all or part of the received usage fee to the content asset management apparatus 1. Similarly, the payment processing unit 17 of the content asset management apparatus 1 may receive the usage fee and notify the content delivery apparatus 2 that the usage fee has been paid to the content delivery apparatus 2. The delivery control unit 21 performs control to deliver delivery data of the entire musical piece to the user.

An operation performed by the content delivery apparatus 2 and a content delivery method performed by the content delivery apparatus 2 will be described with reference to a flowchart shown in FIG. 9. The flowchart shown in FIG. 9 corresponds to processing that a content delivery program stored in the content delivery apparatus 2 causes a computer to perform.

After processing starts in FIG. 9, the communication unit 20 determines whether the user has given an instruction to reproduce a highly evaluated divided block in step S301. If the instruction to deliver the highly evaluated divided block is given (YES), the data acquisition unit 22 acquires an aggregation evaluation value of each divided block from the content asset management apparatus 1 in step S302. The content acquisition unit 23 acquires delivery data of the highly evaluated divided block from the content asset management apparatus 1 in step S303.

The payment processing unit 25 determines whether the user has paid the usage fee in step S304. If the user has paid the usage fee (YES), the delivery control unit 21 delivers delivery data of the divided block to the user in step S305, and the content delivery apparatus 2 ends the processing. If the user has not paid the usage fee in step S304 (NO), the content delivery apparatus 2 ends the processing. The payment processing unit 25 transmits the usage fee to the content asset management apparatus 1 at an appropriate timing.

If the user has not given the instruction to deliver the highly evaluated divided block in step S301 (NO), the communication unit 20 determines whether the user has given an instruction to deliver the entire musical piece in step S311. If the instruction to reproduce the entire musical piece is given (YES), the data acquisition unit 22 acquires data on the musical piece from the content asset management apparatus 1 in step S312. The content acquisition unit 23 acquires delivery data of the entire musical piece from the content asset management apparatus 1 in step S313.

The payment processing unit 25 determines whether the user has paid the usage fee in step S314. If the user has paid the usage fee (YES), the delivery control unit 21 delivers the delivery data of the entire musical piece to the user in step S315, and the content delivery apparatus 2 ends the processing. If the user has not given the instruction to reproduce the entire musical piece in step S311 (NO), or if the user has not paid the usage fee in step S314 (NO), the content delivery apparatus 2 ends the processing. The payment processing unit 25 transmits the usage fee to the content asset management apparatus 1 at an appropriate timing.

According to a third embodiment described above, the content delivery apparatus 2 can deliver, to the user, only a highly evaluated divided block that the user desires to use. Further, if the user desires to use the entire musical pieces, the content delivery apparatus 2 can deliver the entire musical piece to the user.

A third embodiment may be further configured as follows. A divided block that the user desires to use may vary depending on a season, a time zone, and a location where the user desires to receive the delivery of the divided block. It is desirable to deliver the most appropriate highly evaluated divided block according to at least one of a season, a time of day, and a location where the user desires to receive the delivery of the divided block.

Therefore, it is preferable that an evaluation value aggregation unit 14 generate an aggregation evaluation value as follows. The evaluation value aggregation unit 14 aggregates evaluation values obtained for each divided block by a plurality of evaluators who evaluate one or more divided blocks from a plurality of divided blocks. At this time, the evaluation value aggregation unit 14 generates aggregation evaluation values individually according to at least one of a season, a time of day, and a location when the evaluators evaluate the divided blocks.

FIG. 10 shows examples of aggregation evaluation values obtained by the evaluation value aggregation unit 14 individually aggregating evaluation values for each divided block, for each season, for each time of day, and for each location. In the example shown in FIG. 10, a season is divided into four categories: spring, summer, autumn, and winter, a time of day is divided into two categories: morning and afternoon, and a location is divided into two categories: region R1 and region R2. In the example, spring is assumed to be from March to May, summer is assumed to be from June to August, autumn is assumed to be from September to November, and winter is assumed to be from December to February, but how months are divided into seasons is arbitrary. A time of day or a location may be divided into three or more categories. As a region for dividing a location, the location may be divided by country, by state in the United States, or by prefecture in Japan.

The content management table stores aggregation evaluation values obtained by individually aggregating evaluation values for each season, for each time of day, and for each location shown in FIG. 10, as aggregation evaluation values corresponding to each divided block. That is, the electronic ledger management unit 13 of the content asset management apparatus 1 manages auxiliary information indicating an evaluation time condition which is at least one of a season, a time of day, and a location when each evaluator of the plurality of evaluators evaluates one or more divided blocks of the plurality of divided blocks. The electronic ledger management unit 13 manages an aggregation evaluation value obtained by aggregating evaluation values for each evaluation time condition as an evaluation value for each divided block.

When an instruction to deliver a highly evaluated divided block having an evaluation value equal to or more than a threshold value is received form the user, the content acquisition unit 23 extracts one or more divided blocks having evaluation values equal to or more than the threshold value based on aggregation evaluation values for each evaluation time condition. Specifically, when the evaluation time condition is a season, the content acquisition unit 23 extracts a divided block based on an aggregation evaluation value of a season corresponding to a season where the user gives an instruction to deliver the divided block.

As an example, when the threshold value is set to be 45, if the season where the user gives the instruction to deliver the divided block is spring, only Chorus C2 is extracted. If the season is summer or autumn, Chorus C2 and Chorus C3 are extracted, and if the season is winter, only Chorus C2 is extracted.

When the evaluation time condition is a time of day, the content acquisition unit 23 extracts a divided block based on an aggregation evaluation value of a time of day corresponding to a time of day where the user gives an instruction to deliver a divided block. When the evaluation time condition is a location, the content acquisition unit 23 extracts a divided block based on an aggregation evaluation value of a location corresponding to a location where the user gives an instruction to deliver a divided block.

Figure 11:
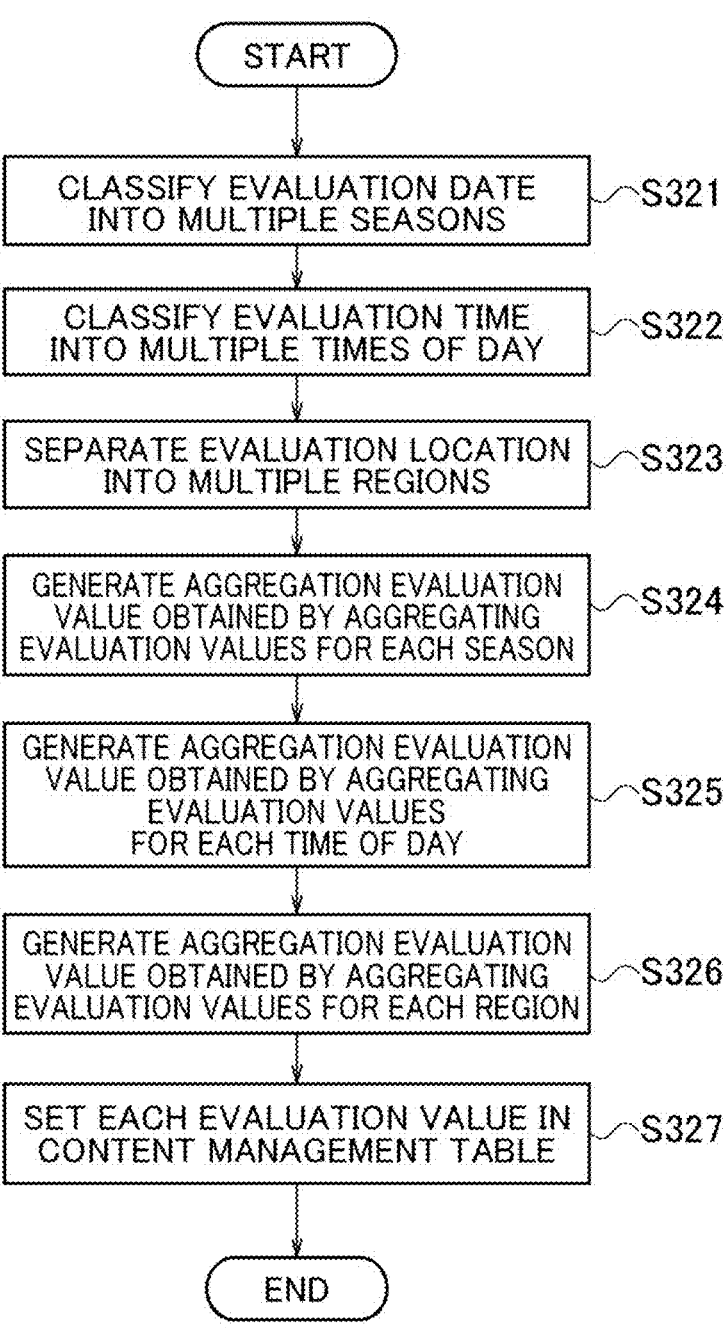
FIG. 11 is a flowchart illustrating processing for generating the aggregation evaluation values obtained by individually aggregating evaluation values for each season, for each time of day, and for each location shown in FIG. 10, which is performed by the content asset management apparatus according to a third embodiment.

The aggregation evaluation values obtained by individually aggregating evaluation values for each season, for each time of day, and for each location shown in FIG. 10 can be generated by the evaluation value aggregation unit 14 performing processing shown in a flowchart of FIG. 11. After the processing starts in FIG. 11, the evaluation value aggregation unit 14 classifies the evaluation date when an evaluator has evaluated a divided block into a plurality of seasons in step S321. The evaluation value aggregation unit 14 classifies the evaluation time when an evaluator has evaluated a divided block into a plurality of times of day in step S322. The evaluation value aggregation unit 14 separates an evaluation location where an evaluator has evaluated a divided block into a plurality of regions in step S323.

The order in which steps S321, S322, and S323 are performed is arbitrary. It is possible to roughly grasp the evaluation location in step S323 using a location information service using an IP address of an evaluator terminal 3 and a location information service using base station information of a wireless LAN.

The evaluation value aggregation unit 14 generates an aggregation evaluation value obtained by aggregating evaluation values for each season in step S324, generates an aggregation evaluation value obtained by aggregating evaluation values for each time of day in step S325, and generates an aggregation evaluation value obtained by aggregating evaluation values for each region in step S326. The electronic ledger management unit 13 sets each aggregation evaluation value in the content management table in step S327.

Figure 12:
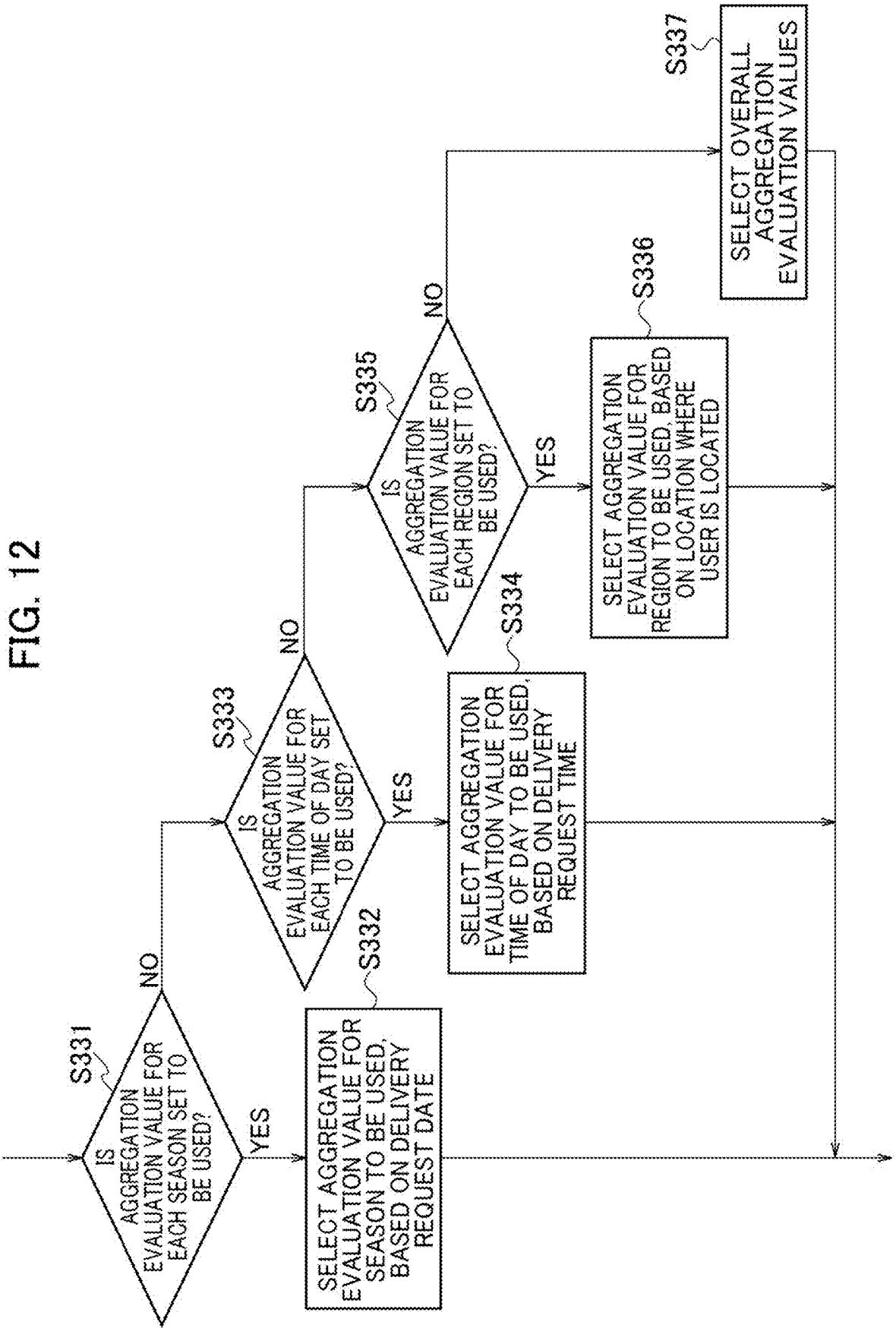
FIG. 12 is a flowchart illustrating an operation performed by the content delivery apparatus according to a third embodiment, the content delivery method according to a third embodiment, and partial processing that the content delivery program according to a third embodiment causes a computer to perform when the aggregation evaluation values obtained by individually aggregating evaluation values for each season, for each time of day, and for each location shown in FIG. 10 are used.

As described above, for cases where a highly evaluated divided block is extracted using aggregation evaluation values obtained by individually aggregating evaluation values for each time of day and each location, steps S331 to S337 shown in FIG. 12 may be performed between step S302 and step S303 shown in FIG. 9.

In FIG. 12, the evaluation value aggregation unit 14 determines whether an aggregation evaluation value for each season is set to be used in step S331. If an aggregation evaluation value for each season is set to be used (YES), the evaluation value aggregation unit 14 selects an aggregation evaluation value for a season to be used, based on a delivery request date when the user has requested delivery of a divided block in step S332. If an aggregation evaluation value for each season is not set to be used (NO), the evaluation value aggregation unit 14 determines whether an aggregation evaluation value for each time of day is set to be used in step S333.

If an aggregation evaluation value for each time of day is set to be used in step S333 (YES), the evaluation value aggregation unit 14 selects an aggregation evaluation value for a time of day to be used, based on a delivery request time when the user has requested delivery of a divided block in step S334. If an aggregation evaluation value for each time of day is not set to be used (NO), the evaluation value aggregation unit 14 determines whether an aggregation evaluation value for each region is set to be used in step S335.

If an aggregation evaluation value for each region is set to be used (YES) in step S335, the evaluation value aggregation unit 14 selects an aggregation evaluation value for a region to be used, based on a location where the user is located in step S336. It is possible to roughly grasp the location where the user is located using an IP address of the user terminal 5, base station information of a wireless LAN, and the like. If an aggregation evaluation value for each region is not set to be used (NO), the evaluation value aggregation unit 14 selects overall aggregation evaluation values without classification by a season, a time of day, and a region shown in FIG. 5 in step S337.

Regardless of which of the aggregation evaluation values shown in FIG. 5, or which of the aggregation evaluation values for each evaluation time condition shown in FIG. 10, are used, the content delivery apparatus 2 is preferably configured as follows. After the content delivery apparatus 2 delivers delivery data of the divided block or the entire musical piece to the user terminal 5, the content delivery apparatus 2 delivers information on the divided block delivered to the user terminal 5.

When receiving an instruction to deliver the divided block or the entire musical piece from the user, the data acquisition unit 22 acquires data indicating a rights holder of each divided block from the content asset management apparatus 1. The content acquisition unit 23 acquires delivery data of one or more divided blocks. The delivery control unit 21 performs control such that the delivery data is delivered to the user terminal 5.

After the end of delivery of the delivery data by the delivery control unit 21, the data acquisition unit 22 generates image information collectively indicating rights holders of one or more divided blocks. The delivery control unit 21 performs control such that the image information is delivered to the user terminal 5.

It is not preferable that the delivery control unit 21 delivers image information indicating a rights holder of each divided block to the user each time the delivery control unit 21 ends delivery of each divided block of one or more divided blocks. It is preferable that the delivery control unit 21 delivers image information collectively indicating rights holders of one or more divided blocks to the user.

Figure 13:
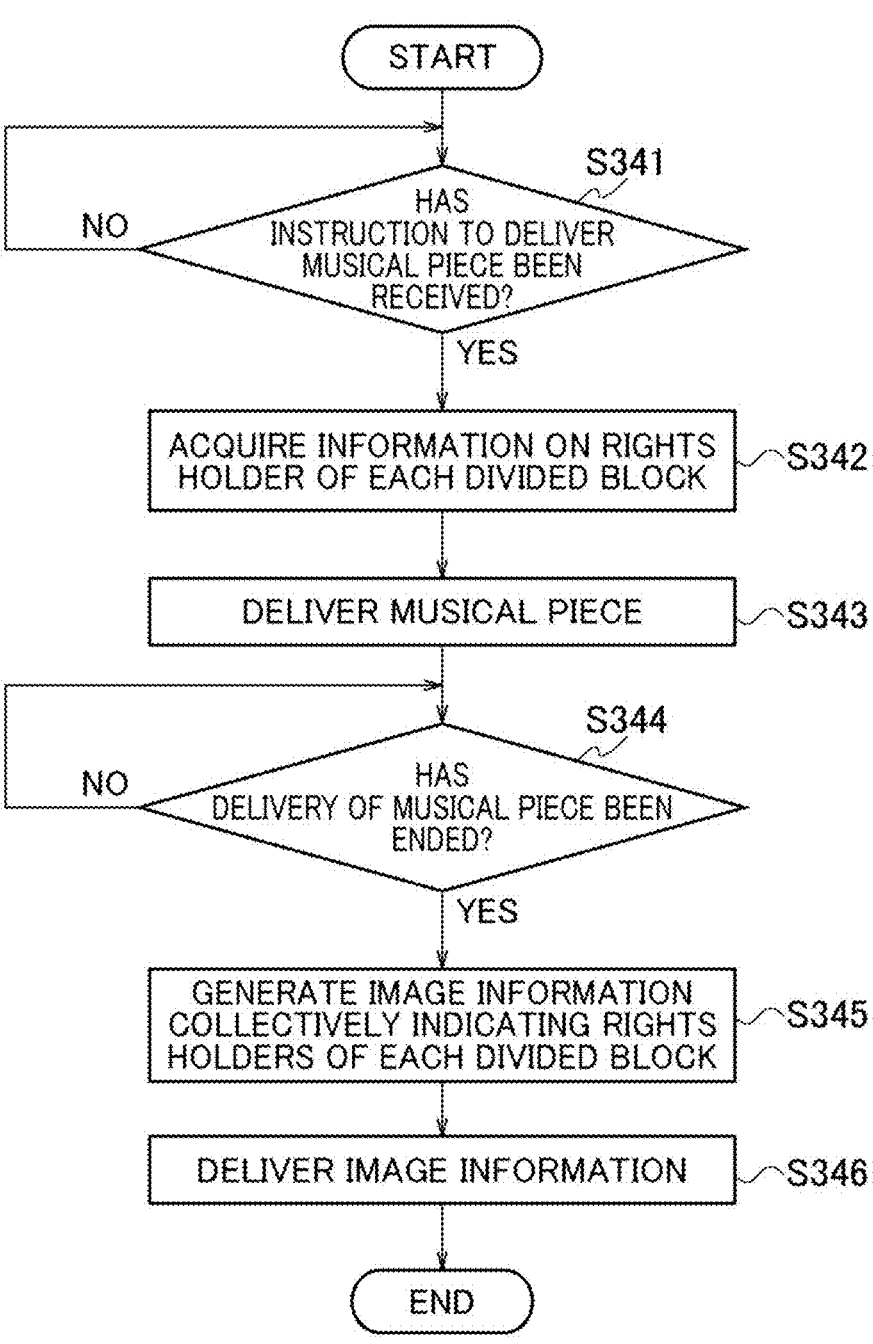
FIG. 13 is a flowchart illustrating processing of delivering image information indicating a rights holder of a divided block to a user in a third embodiment.

A description will be given with reference to a flowchart shown in FIG. 13 regarding processing of delivering image information indicating a rights holder of a divided block to the user. After processing starts in FIG. 13, the communication unit 20 determines whether an instruction to deliver a musical piece is received from the user in step S341. If the instruction to deliver a musical piece is not received (NO), the communication unit 20 repeats the processing in step S341.

If the instruction to deliver a musical piece is received in step S341 (YES), the data acquisition unit 22 acquires information on a rights holder of each divided block in step S342. The delivery control unit 21 delivers a musical piece to the user terminal 5 in step S343. FIG. 13 does not show processing performed by the payment processing unit 25. The delivery control unit 21 determines whether delivery of a musical piece has been ended in step S344. If the delivery of a musical piece has not been ended (NO), the delivery control unit 21 repeats the processing in step S344.

If the delivery of a musical piece has been ended in step S344 (YES), the data acquisition unit 22 generates image information collectively indicating rights holders of each divided block in step S345. The delivery control unit 21 delivers the image information to the user terminal 5 in step S346, and the content delivery apparatus 2 ends the processing. Step S345 may be performed between step S342 and step S343. Further, a format of information collectively indicating rights holders of each divided block is not limited to an image format, but may be any other data format. The delivery control unit 21 may deliver only the information collectively indicating rights holders of each divided block, and each user terminal 5 may generate a display image, for example.

Fourth Embodiment

Figure 14:
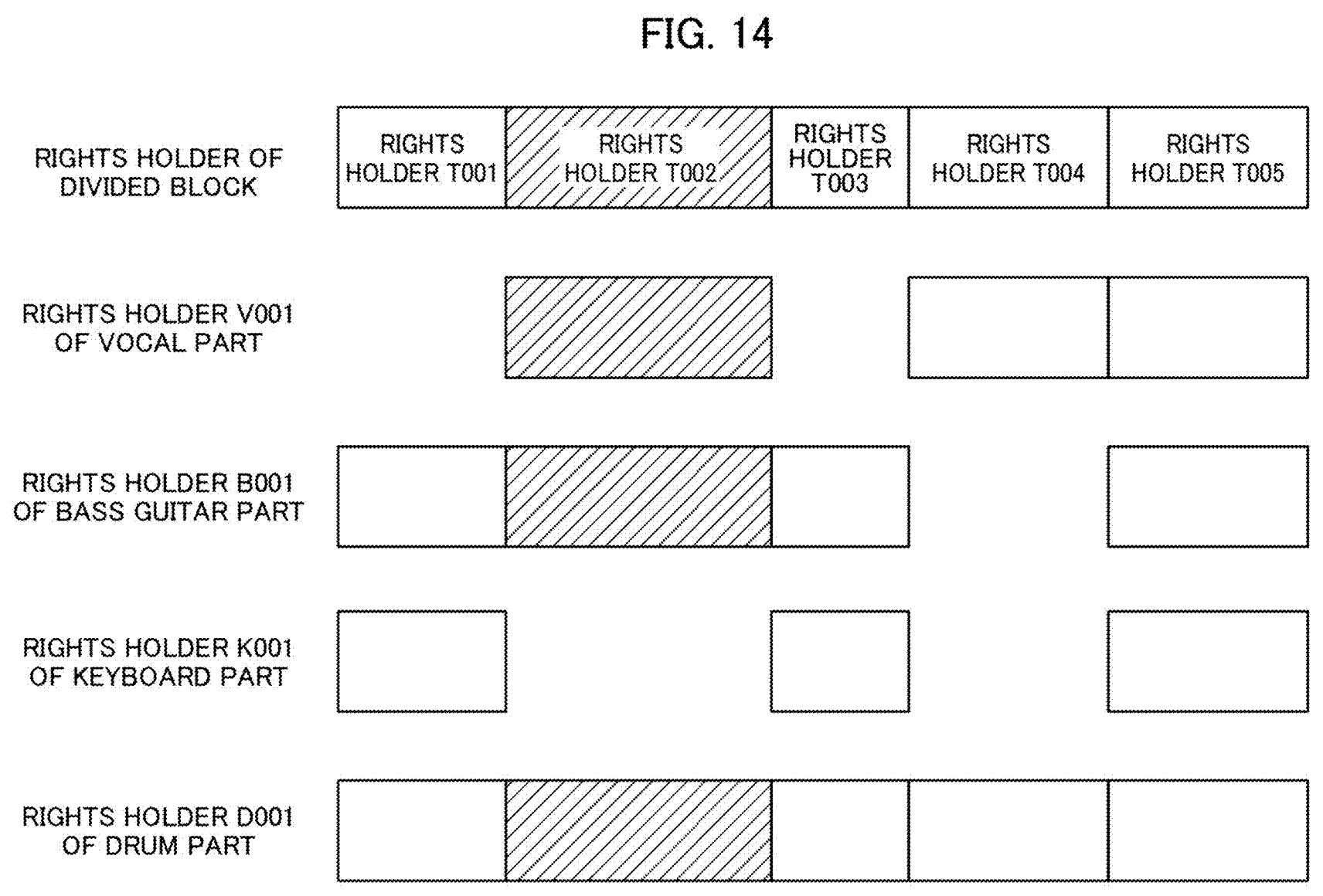

A fourth embodiment has features in a method of setting a rights holder of content in a content asset management apparatus 1. Descriptions of common parts between a fourth embodiment and a first embodiment may be omitted. In a fourth embodiment, the content is assumed to be a musical piece. As shown in FIG. 14, one musical piece is divided into five divided blocks, and rights holders of the five divided blocks are set to be a rights holder T001 to a rights holder T005. In this way, one musical piece is divided into a plurality of divided blocks in a time direction, and a rights holder is set for each divided block.

In an example shown in FIG. 14, the musical piece includes four tracks: a vocal part, a bass guitar part, a keyboard part, and a drum part. A rights holder V001 is set for the vocal part, and a rights holder B001 is set for the bass guitar part. A rights holder K001 is set for the keyboard part, and a rights holder D001 is set for the drum part. In this way, a rights holder is set for each track of a plurality of tracks in a single musical piece.

A content management table records rights holders for each divided block and rights holders for each track. An electronic ledger management unit 13 manages the content management table which records rights holders for each divided block and rights holders for each track.

A payment processing unit 17 aggregates usage fees paid by the user when the user uses any one of a plurality of divided blocks for each divided block. The payment processing unit 17 distributes the distribution amount based on the usage fees aggregated for each divided block, at least to a rights holder of the used divided block and rights holders of tracks among the plurality of tracks included in the used divided block.

In FIG. 14, it is assumed that the divided block of the rights holder T002 shown with hatching is used. This divided block includes the vocal part, the bass guitar part, and the drum part, but does not include the keyboard part. In this case, the payment processing unit 17 distributes the distribution amount based on the usage fees aggregated for each divided block to the rights holder T002 of the used divided block, and to the rights holder V001 of the vocal part, the rights holder B001 of the bass guitar part, and the rights holder D001 of the drum part.

As in a first embodiment, the payment processing unit 17 may further distribute the distribution amount to an evaluator of the divided block shown with hatching.

According to a fourth embodiment described above, it is possible to set rights holders for one piece of content in a two-dimensional manner and distribute the distribution amount.

Fifth Embodiment

A fifth embodiment has features in a configuration and an operation of a content asset management apparatus 1 when rights of any one of a plurality of divided blocks are transferred to a new rights holder. Descriptions of common parts between a fifth embodiment and a first embodiment may be omitted. A storage unit 43 of a rights holder terminal 4 stores a divided block access code, and due to a rights holder operating an operation unit 41, the rights transfer of a rights holder managed by the content asset management apparatus 1 can be notified to an electronic ledger management unit.

After an electronic ledger management unit 13 receives the notification of the rights transfer of the rights holder, the electronic ledger management unit 13 updates, to a new rights holder, the rights holder of the divided block that held the rights transferred to the new rights holders in a content management table. An evaluation value aggregation unit 14 acquires information on the consideration when the rights of the divided block are transferred to the new rights holder from the rights holder before the transfer. When the rights of the divided block are transferred to the new rights holder, a value of the divided block that held the rights transferred may change. The value of the divided block may increase or decrease.

When the value of the divided block that held the rights transferred to the new rights holder changes, the evaluation value aggregation unit 14 re-evaluates an aggregation evaluation value of the divided block that held the rights transferred to the new rights holder and generates a new aggregation evaluation value. In addition, the evaluation value aggregation unit 14 re-evaluates an aggregation evaluation value of each divided block other than the divided block that held the rights transferred to the new rights holder, among the plurality of divided blocks, and generates a new aggregation evaluation value.

The evaluation value aggregation unit 14 increases an aggregation evaluation value of the divided block that held the rights transferred to the new rights holder, and an aggregation evaluation value of each divided block other than the divided block that held the rights transferred to the new rights holder at the same ratio.

The electronic ledger management unit 13 updates an aggregation evaluation value of each divided block re-evaluated by the evaluation value aggregation unit 14 to a new aggregation evaluation value.

An operation performed by the content asset management apparatus 1 and a content asset management method performed by the content asset management apparatus 1 will be described with reference to a flowchart shown in FIG. 15. The flowchart shown in FIG. 15 corresponds to processing that a content asset management program stored in the content asset management apparatus 1 causes a computer to perform.

Figure 15:
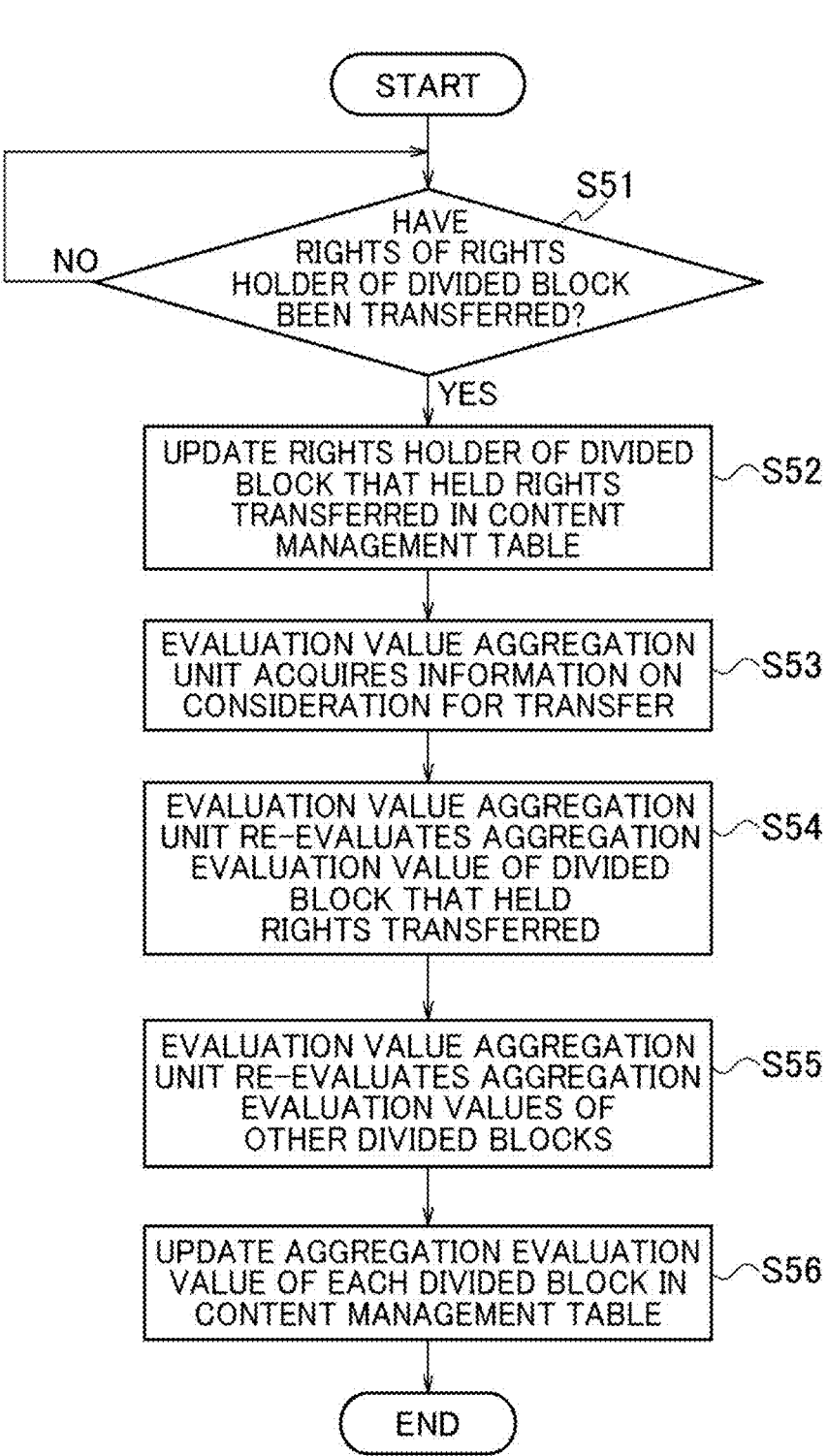
FIG. 15 is a flowchart illustrating an operation performed by a content asset management apparatus according to a fifth embodiment, a content asset management method according to a fifth embodiment, and processing that a content asset management program according to a fifth embodiment causes a computer to perform.

After processing starts in FIG. 15, the electronic ledger management unit 13 determines whether the rights of a rights holder of any one of the divided blocks have been transferred in step S51. If the rights of the rights holder of the divided block have not been transferred (NO), the electronic ledger management unit 13 repeats the processing in step S51. Alternatively, if the rights of the rights holder of any one of the divided blocks have been transferred (YES), the electronic ledger management unit 13 updates, to the new rights holder, the rights holder of the divided block that held the rights transferred to the new rights holder in the content management table in step S52.

The evaluation value aggregation unit 14 acquires information on the consideration when the rights of the divided block are transferred to the new rights holder in step S53. The evaluation value aggregation unit 14 re-evaluates an aggregation evaluation value of the divided block that held the rights transferred to the new rights holder in step S54. The evaluation value aggregation unit 14 may re-evaluate an aggregation evaluation value only when a value of the divided block that held the rights transferred increases. The evaluation value aggregation unit 14 re-evaluates an aggregation evaluation value of each divided block other than the divided block that held the rights transferred to the new rights holder in step S55.

The electronic ledger management unit 13 updates an aggregation evaluation value of each divided block in the content management table to a new aggregation evaluation value re-evaluated by the evaluation value aggregation unit 14 in step S56, and the content asset management apparatus 1 ends the processing.

The electronic ledger management unit 13 may perform step S52 after step S55. Step S52 and step S56 may be performed simultaneously, step S56 may be performed after step S52, or step S52 may be performed after step S56.

According to a fifth embodiment described above, when the rights of the divided block are transferred to the new rights holder and the value of the divided block changes, it is possible to re-evaluate aggregation evaluation values of the divided block that held the rights transferred to the new rights holder, and each divided block other than the divided block that held the rights transferred, and update values to new aggregation evaluation values.

Sixth Embodiment

A sixth embodiment has features in a configuration and an operation of a content delivery apparatus 2 when a restriction on delivery or editing is applied to any one of a plurality of divided blocks. Descriptions of common parts between a sixth embodiment and a first embodiment may be omitted. As shown in FIG. 16, as the restriction on delivery, the availability of the delivery indicating whether a rights holder permits delivery is set for each divided block in a content management table. In an example shown in FIG. 16, a rights holder of Chorus C2 sets delivery as not permitted.

When an instruction to deliver the content is received from the user, a data acquisition unit 22 acquires data indicating whether delivery is possible for each divided block from a content asset management apparatus 1. If the content includes a divided block which is not deliverable, a notification unit 24 notifies a user that the content includes the divided block which is not deliverable, and inquires the user whether the user allows to receive delivery of content without the divided block which is not deliverable.

A content acquisition unit 23 acquires, from the content asset management apparatus 1, delivery data of a divided block without a divided block which is not deliverable. It is assumed that the user responds to the notification unit 24 that the user allows delivery of the content without the divided block which is not deliverable. Further, it is assumed that the user has paid a usage fee for receiving the delivery of the content to a payment processing unit 25. The content acquisition unit has acquired the delivery data of the divided block without the divided block which is not deliverable, and a delivery control unit 21 performs control such that the delivery data is delivered to a user terminal 5.

It is preferable that the delivery control unit 21 performs fade-out processing on a divided block immediately before the divided block which is not deliverable, and performs fade-in processing on a divided block immediately after the divided block which is not deliverable. It is sufficient if the delivery control unit 21 only performs fade-out processing on the divided block immediately before the divided block which is not deliverable.

The delivery control unit 21 may perform control such that content is delivered in a state where the divided block which is not deliverable is replaced with another divided block. In this case also, the notification unit 24 may inquire the user whether the user allows the divided block which is not deliverable to be replaced with another divided block.

Figure 17:
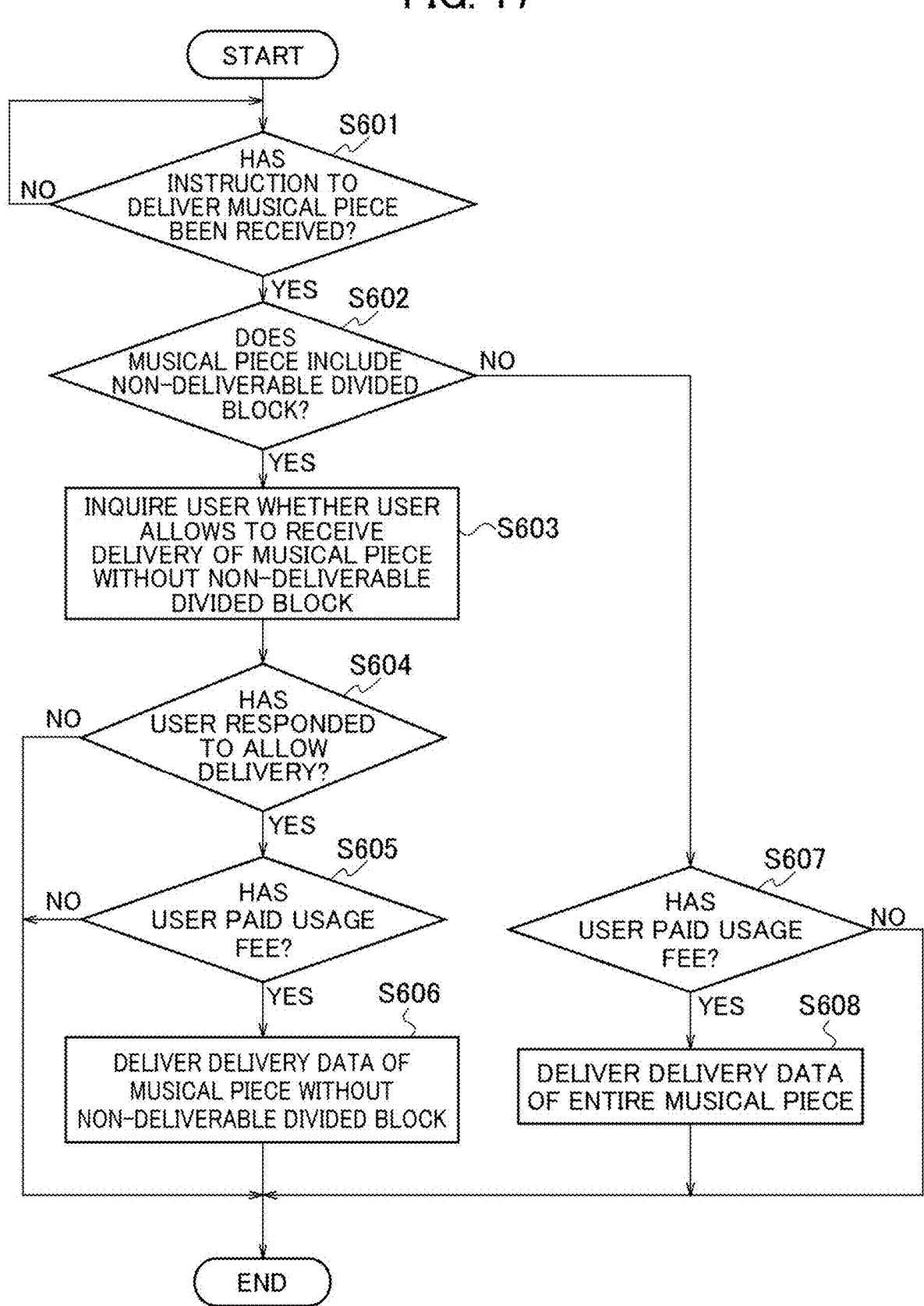
FIG. 17 is a flowchart illustrating an operation performed by a content delivery apparatus according to a sixth embodiment, a content delivery method according to a sixth embodiment, and partial processing that a content delivery program according to a sixth embodiment causes a computer to perform when content including a divided block which is not deliverable is delivered.

A description will be given with reference to flowcharts shown in FIGS. 17 and 18 regarding an operation performed by the content delivery apparatus 2, and a content delivery method performed by the content delivery apparatus 2, when delivering content including the divided block which is not deliverable. The flowcharts shown in FIGS. 17 and 18 correspond to processing that a content delivery program stored in the content delivery apparatus 2 causes a computer to perform. In FIGS. 17 and 18, the content is assumed to be a musical piece.

After processing starts in FIG. 17, a communication unit 20 determines whether an instruction to deliver a musical piece has been received from the user in step S601. If the instruction to deliver a musical piece has not been received (NO), the communication unit 20 repeats the processing in step S601. Alternatively, if the instruction to deliver a musical piece has been received in step S601 (YES), the data acquisition unit 22 determines whether a musical piece includes the divided block which is not deliverable in step S602. If the musical piece includes the divided block which is not deliverable (YES), the notification unit 24 notifies the user that the musical piece to be delivered includes the divided block which is not deliverable, and inquires the user whether the user allows delivery of a musical piece without the divided block which is not deliverable in step S603.

The notification unit 24 determines whether the user has responded to allow the delivery in step S604. If the user has responded to allow the delivery (YES), the payment processing unit 25 determines whether the user has paid a usage fee in step S605. The content acquisition unit 23 has acquired the delivery data of the musical piece without the divided block which is not deliverable, and if the user has paid the usage fee (YES), the delivery control unit 21 performs control such that the delivery data is delivered in step S606, and the content delivery apparatus 2 ends the processing.

If the user has not responded to allow the delivery in step S604 (NO), or if the user has not paid the usage fee in step S605 (NO), the content delivery apparatus 2 ends the processing.

If the musical piece does not include the divided block which is not deliverable (NO) in step S602, the payment processing unit 25 determines whether the user has paid the usage fee in step S607. The usage fee may differ depending on whether the musical piece includes or does not include the divided block which is not deliverable. If the user has paid the usage fee (YES), the delivery control unit 21 performs control such that delivery data of the entire musical piece acquired by the content acquisition unit 23 is delivered in step S608, and the content delivery apparatus 2 ends the processing.

In FIG. 17 also, the payment processing unit 25 transmits the usage fee to the content asset management apparatus 1 at an appropriate timing.

Steps S603 to S606 shown in FIG. 17 may be replaced with steps S611 to S616 shown in FIG. 18. In FIG. 18, the notification unit 24 inquires the user whether the user desires to replace the divided block which is not deliverable with a similar divided block for delivery in step S611. The notification unit 24 determines whether the user has responded that the user desires to receive the replacement delivery in step S612.

If the user has responded that the user desires to receive the replacement delivery in step S612 (YES), the payment processing unit 25 determines whether the user has paid the usage fee in step S613. The content acquisition unit 23 has acquired delivery data of the musical piece in which the divided block which is not deliverable is replaced with another divided block, and if the user has paid the usage fee (YES), the delivery control unit 21 performs control such that the delivery data is delivered in step S614, and the content delivery apparatus 2 ends the processing. If the user has not paid the usage fee in step S613 (NO), the content delivery apparatus 2 ends the processing.

If the delivery of a divided block of Chorus C2 is not permitted as shown in FIG. 16, the delivery control unit 21 performs control to deliver delivery data of a musical piece in which the divided block of Chorus C2 is replaced with a divided block of Chorus C1 that is similar to Chorus C2 in step S614, for example.

If the user has not responded that the user desires to receive the replacement delivery in step S612 (NO), the payment processing unit 25 determines whether the user has paid the usage fee in step S615. The content acquisition unit 23 has acquired delivery data of a musical piece without the divided block which is not deliverable, and if the user has paid the usage fee (YES), the delivery control unit 21 performs control to deliver the delivery data in step S616, and the content delivery apparatus 2 ends the processing. If the user has not paid the usage fee (NO) in step S615, the content delivery apparatus 2 ends the processing.

In FIG. 18 also, the payment processing unit 25 transmits the usage fee to the content asset management apparatus 1 at an appropriate timing.

As shown in FIG. 19, as a restriction on editing, the availability of combination, which indicates whether a rights holder permits combination with other divided blocks, is set for each divided block in the content management table. In an example shown in FIG. 19, a rights holder of Chorus C3 sets the combination with other divided blocks as not permitted.

The user can give an instruction to deliver combination content obtained by combining two or more divided blocks from a plurality of divided blocks. The user may give an instruction to deliver combination content obtained by combining two or more divided blocks having the highest aggregation evaluation value and the next highest aggregation evaluation value, or aggregation evaluation values lower than the next highest aggregation evaluation value, for example. The user may give an instruction to deliver combination content obtained by combining divided blocks having aggregation evaluation values which are equal to or more than a predetermined threshold value.

When an instruction to deliver combination content is received, the data acquisition unit 22 determines two or more divided blocks to be combined, based on aggregation evaluation values. The data acquisition unit 22 acquires, from the content asset management apparatus 1, aggregation evaluation values of two or more divided blocks to be combined, and data indicating whether to permit combination with other divided blocks. The content acquisition unit 23 acquires delivery data of the two or more divided blocks to be combined from the content asset management apparatus 1.

Suppose that all divided blocks included in the combination content are permitted to be combined with other divided blocks, and the user pays a usage fee for receiving the delivery of the combination content. In the above case, the delivery control unit 21 performs control to deliver, to the user terminal 5, the delivery data of two or more divided blocks acquired by the content acquisition unit 23 as the combination content.

A description will be given with reference to a flowchart shown in FIG. 20 regarding an operation performed by the content delivery apparatus 2, and a content delivery method performed by the content delivery apparatus 2, when delivering content including a divided block in which combination is not permitted. The flowchart shown in FIG. 20 corresponds to processing that a content delivery program stored in the content delivery apparatus 2 causes a computer to perform.

Figure 20:
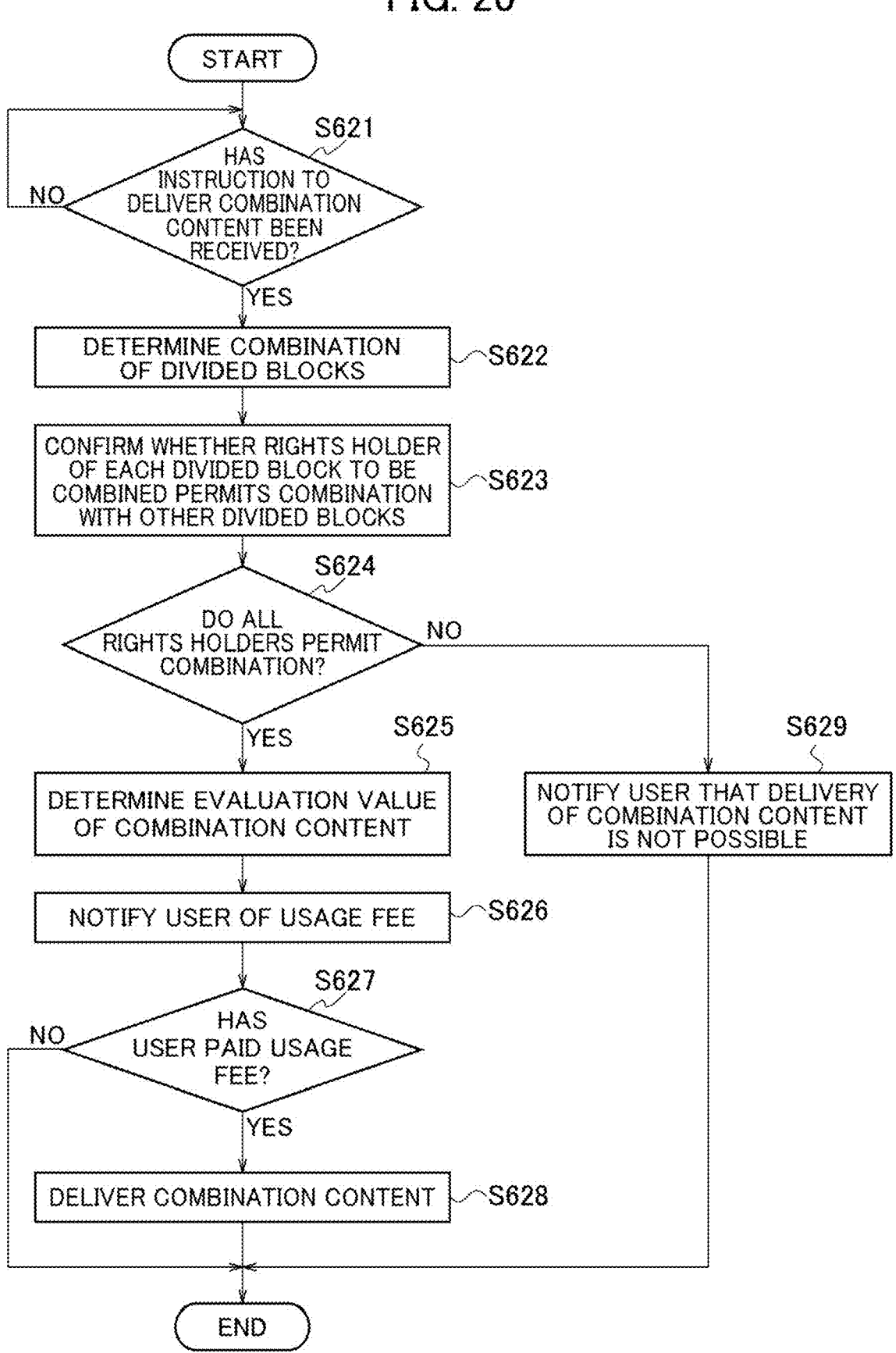
FIG. 20 is a flowchart illustrating an operation performed by the content delivery apparatus according to a sixth embodiment, a content delivery method according to a sixth embodiment, and partial processing that the content delivery program according to a sixth embodiment causes a computer to perform when delivering content including a divided block in which combination is not permitted.

After processing starts in FIG. 20, the communication unit 20 determines whether an instruction to deliver combination content has been received from the user in step S621. If the instruction to deliver the combination content has not been received (NO), the communication unit 20 repeats the processing in step S621.

If the instruction to deliver the combination content has been received in step S621 (YES), the data acquisition unit 22 determines the combination of two or more divided blocks in step S622. The data acquisition unit 22 confirms whether a rights holder of each divided block to be combined permits combination with other divided blocks in step S623. The data acquisition unit 22 determines whether all rights holders of the divided blocks to be combined permit combination with other divided blocks in step S624.

If all rights holders permit the combination (YES) in step S624, the data acquisition unit 22 determines an evaluation value of combination content based on aggregation evaluation values of two or more divided blocks to be combined in step S625. The notification unit 24 notifies the user of a usage fee based on the evaluation value of the combination content in step S626. An evaluation value of combination content and a usage fee may be determined in advance, and steps S625 and S626 may not be performed.

The payment processing unit 25 determines whether the user has paid the usage fee in step S627. If the user has paid the usage fee (YES), the delivery control unit 21 performs control to deliver the delivery data of the combination content acquired by the content acquisition unit 23 in step S628, and the content delivery apparatus 2 ends the processing. If the user has not paid the usage fee (NO) in step S627, the content delivery apparatus 2 ends the processing.

If a rights holder of any of the divided blocks to be combined does not permit the combination (NO) in step S624, the notification unit 24 notifies the user that the delivery of the combination content is not possible in step S629, and the content delivery apparatus 2 ends the processing.

In FIG. 20 also, the payment processing unit 25 transmits the usage fee to the content asset management apparatus 1 at an appropriate timing.

According to a sixth embodiment described above, when a restriction on delivery or editing is applied to any of the plurality of divided blocks, it is possible to determine whether the delivery of the content is possible according to the applied restriction and deliver the content to the user.

Seventh Embodiment

A seventh embodiment has features in a configuration and an operation of a content asset management apparatus 1 when any of a plurality of divided blocks is re-divided or a new element is added to content, thereby modifying the content. Descriptions of common parts between a seventh embodiment and a first embodiment may be omitted. Due to a rights holder operating an operation unit 41, it is possible to notify re-division of a divided block of the content managed by the content asset management apparatus 1. A creator of the content or a rights holder of a divided block can add a new element to the content.

A block division unit 12 shown in FIG. 1 accepts the re-division of any divided block in any content stored in a content storing unit 11 from a rights holder of any divided block. When the block division unit 12 accepts the re-division of any divided block, a notification unit 16 refers to a content management table managed by an electronic ledger management unit 13, and notifies each evaluator of a divided block for which re-division has been accepted that the divided block has been re-divided. The notification unit 16 also notifies each evaluator of information indicating a position where the divided block has been re-divided.

Before the block division unit 12 formally accepts the re-division of a divided block from a rights holder, re-divided divided blocks may be reproduced so that the rights holder can confirm the re-divided divided blocks. If the rights holder instructs the re-division using the operation unit 41 after the confirmation, the block division unit 12 formally accepts the re-division of the divided block.

When the block division unit 12 accepts the re-division of any divided block, the electronic ledger management unit 13 returns an evaluation value to each evaluator of a divided block for which re-division has been accepted recorded in the content management table, and returns a state of the evaluation value of the divided block for which re-division has been accepted to a state before the evaluation. In addition, the notification unit 16 may notify each evaluator that the divided block has been re-divided, and the electronic ledger management unit 13 may perform resetting to distribute an evaluation value according to the length of a block which has been divided.

Specifically, it is assumed that a first divided block before re-division is equally divided into two blocks and a second divided block before re-division is equally divided into 12 blocks while evaluation values of the first divided block and the second divided block are 100 and 120, respectively, for example. In this case, distribution may be made such that an evaluation value of each of two re-divided blocks obtained by dividing the first divided block into two blocks may be 50, and an evaluation value of each of 12 re-divided blocks obtained by dividing the second divided block into 12 blocks may be 10. It is needless to say that the resetting of the evaluation values may be accepted by an instruction from an evaluator. When the evaluation values are returned, an evaluation value storing unit 32 of an evaluator terminal 3 stores the returned evaluation values.

Any one of evaluators to whom the evaluation values have been returned evaluates two or more re-divided blocks obtained by re-dividing a divided block, for each re-divided block, and sets an evaluation value. An evaluation value aggregation unit 14 receives evaluation values of the re-divided blocks and generates an aggregation evaluation value for each re-divided block.

The electronic ledger management unit 13 replaces a divided block for which re-division has been accepted with two or more re-divided blocks, and updates the content management table so as to record the blocks in association with an aggregation evaluation value generated by the evaluation value aggregation unit for each re-divided block.

Any one of the evaluators to whom the evaluation values have been returned may newly evaluate another divided block which is different from the two or more re-divided blocks obtained by re-dividing the divided block. In this case, the evaluation value aggregation unit 14 receives an evaluation value of the newly evaluated other divided block, and generates an aggregation evaluation value of the other divided block. The electronic ledger management unit 13 replaces a divided block for which re-division has been accepted with two or more re-divided blocks, and updates the content management table so as to record the other divided block in association with the aggregation evaluation value generated by the evaluation value aggregation unit 14.

It is assumed that a new element is added to content stored in the content storing unit 11. If the stored content is only a first part of a musical piece, a second part to be added is a new element, and an interlude or introduction to be added is a new element, for example. When a new element is added to the content, the block division unit 12 divides the added new element into one or more blocks and generates one or more additional divided blocks separately from a plurality of divided blocks generated in advance. That is, when a new element is short, the new element may be assumed to be one divided block.

An evaluation value assignment unit 15 assigns the share of an additional evaluation value associated with the addition of the new element to the content to each of a plurality of evaluators of the content to which the new element has been added, and which is recorded in the evaluator management table.

When evaluation values obtained by evaluating the additional divided blocks are received from any of the evaluators, the evaluation value aggregation unit 14 aggregates the evaluation values for each additional divided block and generates an aggregation evaluation value. The electronic ledger management unit 13 adds the additional divided blocks to the plurality of divided blocks generated in advance, and updates the content management table so as to record the additional divided blocks in association with the aggregation evaluation value generated by the evaluation value aggregation unit 14.

A description will be given with reference to a flowchart shown in FIG. 21 regarding an operation performed by the content asset management apparatus 1 and a content asset management method performed by the content asset management apparatus 1 when a divided block is re-divided. The flowchart shown in FIG. 21 corresponds to processing that a content asset management program stored in the content asset management apparatus 1 causes a computer to perform.

Figure 21:
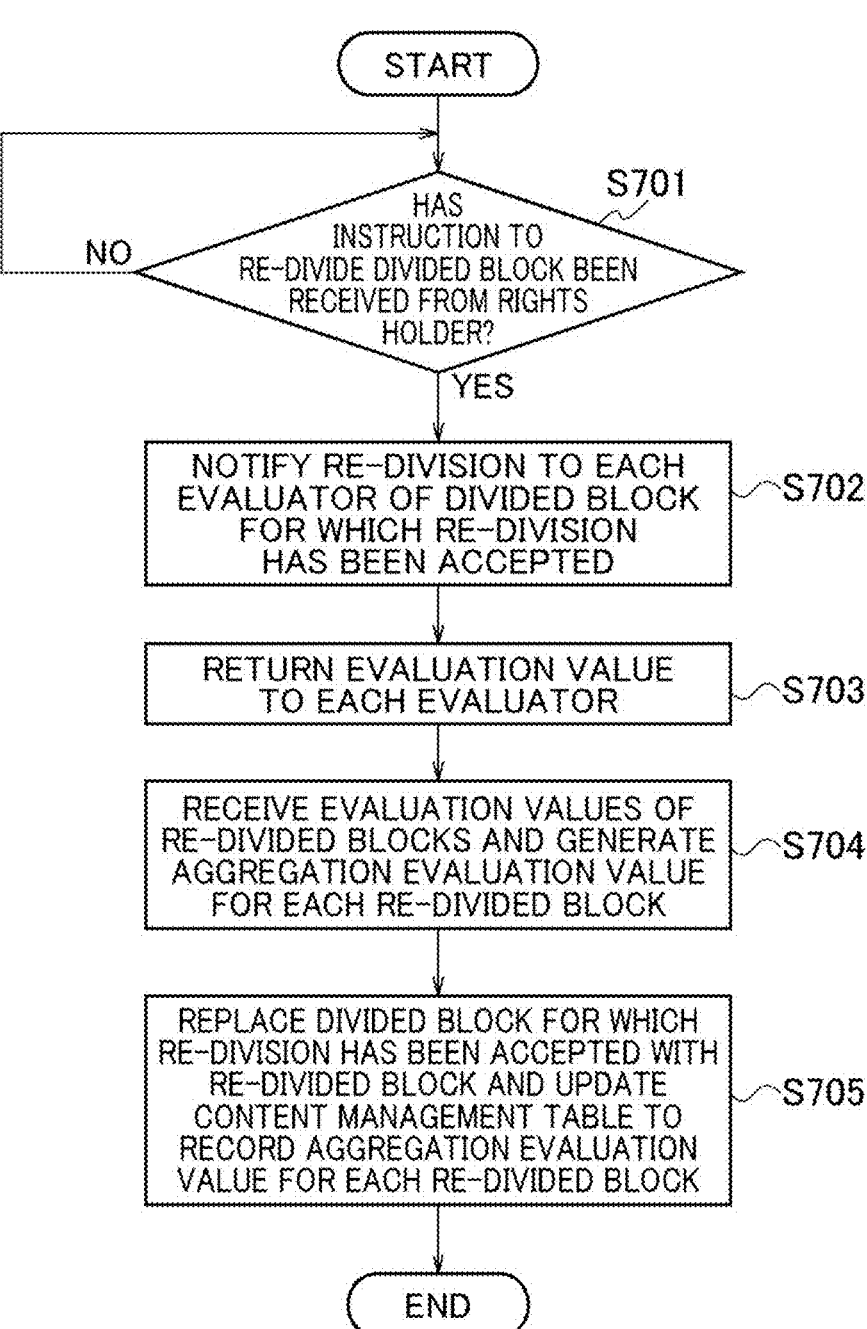
FIG. 21 is a flowchart illustrating an operation performed by a content asset management apparatus according to a seventh embodiment, a content asset management method according to a seventh embodiment, and processing that a content asset management program according to a seventh embodiment causes a computer to perform when a divided block is re-divided.

In FIG. 21, a communication unit 10 determines whether an instruction to re-divide a divided block has been received from a rights holder in step S701. If the instruction to re-divide a divided block has not been received (NO), the communication unit 10 repeats the processing in step S701. Alternatively, if the instruction to re-divide a divided block has been received (YES), the block division unit 12 accepts the re-division of the divided block, and the notification unit 16 notifies each evaluator of a divided block for which re-division has been accepted that the divided block has been re-divided in step S702.

The electronic ledger management unit 13 returns an evaluation value to each evaluator in step S703. The evaluation value aggregation unit 14 receives evaluation values of re-divided blocks and generates an aggregation evaluation value for each re-divided block in step S704. The electronic ledger management unit 13 replaces the divided block for which re-division has been accepted with the re-divided blocks and updates the content management table so as to record an aggregation evaluation value for each re-divided block in step S705, and the content asset management apparatus 1 ends the processing.

Incidentally, it is assumed that after an evaluation value is returned to each evaluator in step S703, any one of the evaluators has not evaluated a divided block. In this case, an aggregation evaluation value of the entire divided block for which re-division has been accepted decreases compared with a value before the re-division. If the aggregation evaluation value has decreased when a payment processing unit 17 determines the distribution amount based on usage fees aggregated for each divided block, the payment processing unit 17 may determine the distribution amount according to an aggregation evaluation value before the re-division.

It may be configured such that an evaluator to whom an evaluation value has been returned can newly evaluate another divided block different from the re-divided block. When an evaluation value of the re-divided block decreases, the evaluation value assigned to the re-divided block can be returned to the evaluator.

A description will be given with reference to a flowchart shown in FIG. 22 regarding an operation performed by the content asset management apparatus 1 and a content asset management method performed by the content asset management apparatus 1 when a new element is added to content. The flowchart shown in FIG. 22 corresponds to processing that a content asset management program stored in the content asset management apparatus 1 causes a computer to perform.

The content storing unit 11 determines whether a new element is added to content in step S711 of FIG. 22. If a new element is not added to the content (NO), the content storing unit 11 repeats the processing in step S711. Alternatively, if a new element is added to the content (YES), the block division unit 12 divides the new element into one or more divided blocks in step S712. The divided blocks obtained by dividing the new element are additional divided blocks.

The evaluation value assignment unit 15 assigns an additional evaluation value to each evaluator in step S713. The evaluation value aggregation unit 14 aggregates evaluation values for each additional divided block and generates an aggregation evaluation value in step S714. The electronic ledger management unit 13 adds the additional divided blocks to a plurality of divided blocks generated in advance and updates the content management table so as to record the aggregation evaluation value in association with the additional divided blocks in step S715, and the content asset management apparatus 1 ends the processing.

According to a seventh embodiment described above, when the content is modified, it is possible to set an aggregation evaluation value according to a state of the modified content.

Eighth Embodiment

In an eighth embodiment, when a rights holder has set delivery as not permitted as described in FIG. 16, the intention of rights holders other than the rights holder who has set delivery as not permitted is respected so as to avoid lowering in an asset value of content. An eighth embodiment has features in a configuration and an operation of a content asset management apparatus 1 for respecting that intention. Descriptions of common parts between an eighth embodiment and a first embodiment may be omitted.

Figure 23:
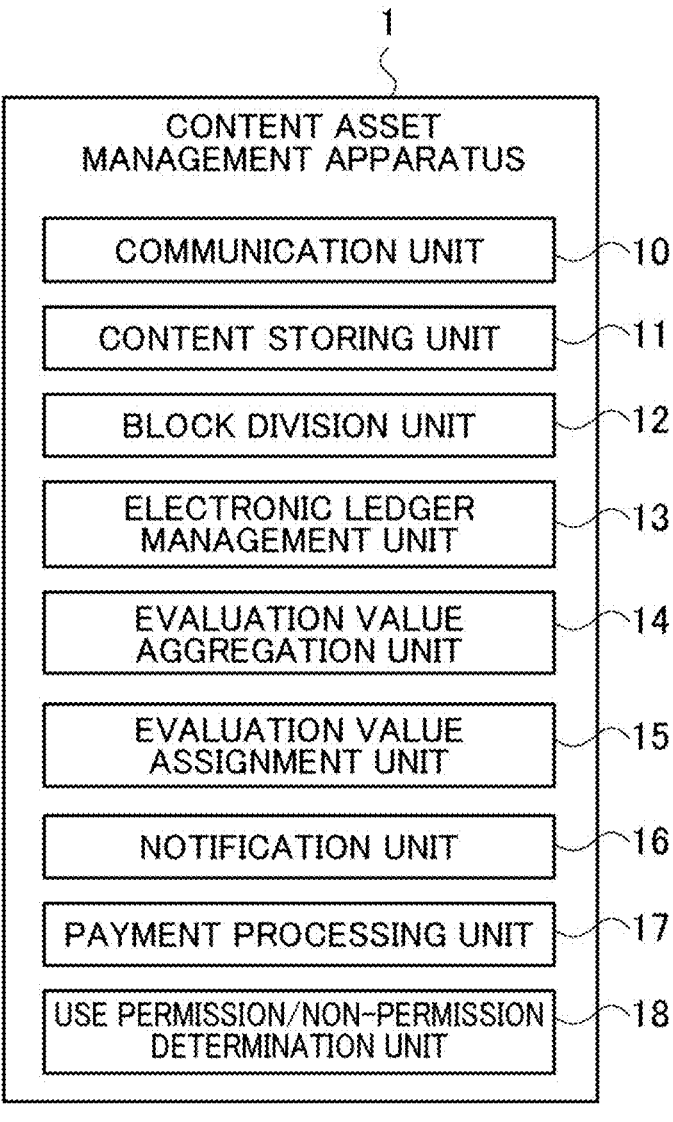
FIG. 23 is a block diagram illustrating a content asset management apparatus according to an eighth embodiment.

As shown in FIG. 23, the content asset management apparatus 1 according to an eighth embodiment includes a use permission/non-permission determination unit 18 in addition to the configuration of the content asset management apparatus 1 shown in FIG. 1. When a user applies to use one or more divided blocks of a plurality of divided blocks, a notification unit 16 requests each rights holder of the divided blocks, for which the user has applied to use, to vote to determine whether to permit the use. An application to use the entire content corresponds to an application to use the one or more divided blocks.

The use permission/non-permission determination unit 18 receives a voting result indicating whether to permit the use from each rights holder. The use permission/non-permission determination unit 18 determines whether to permit the use, based on voting results. The use permission/non-permission determination unit 18 may determine to permit the use if a majority of rights holders out of all rights holders vote to permit the use, or may determine to permit the use if 80% or more of rights holders out of all rights holders vote to permit the use, for example. This eliminates the restriction on the use of the content due to the intention of only very few rights holders who have set delivery as not permitted, and therefore it is possible to avoid lowering in an asset value of the content.

At this time, when the use permission/non-permission determination unit 18 determines to permit the use and a user pays a usage fee, a payment processing unit 17 distributes the distribution amount based on the usage fee to approving rights holders who have voted to permit the use and disapproving rights holders who have voted to not permit the use.

Assuming sum of evaluation values of the approving rights holders is Ysum, the sum of evaluation values of the disapproving rights holders is Nsum, the sum of usage fees paid by users is Call, and $\alpha$ is $0 < \alpha < 1$, it is preferable to determine the distribution amount Cy to the approving rights holders and the distribution amount Cn to the disapproving rights holders based on formulas (1) and (2) below. Here, the sum of the usage fees Call is used as the distribution amount without any changes.

$$Cy = \text{Call} * \left( Ysum / (Ysum + Nsum) \right) * (1 - \alpha) \tag{1}$$

$$Cn = \text{Call} * \left( (Nsum + \alpha * Ysum) / (Ysum + Nsum) \right) \tag{2}$$

Suppose that the distribution amount Cy to the approving rights holders and the distribution amount Cn to the disapproving rights holders are determined based on formulas (1) and (2), and the distribution amount is distributed to the approving rights holders and the disapproving rights holders. In the above case, the distribution can be made such that the distribution amount of each of the disapproving rights holders is higher than the distribution amount of each of the approving rights holders.

However, since it is not preferable to make distribution such that the distribution amount of each of the disapproving rights holders is higher than the distribution amount of each of the approving rights holders at the time of all voting, it is preferable to set a small value for a for each vote. Assuming that $\alpha$ used at the first vote is $\alpha 1$ and $\alpha$ used at the n-th vote (n is two or more) is $\alpha n$, it is preferable to reduce an using formula (3).

$$\alpha n = \alpha 1 / (2^n) \tag{3}$$

As a result, the payment processing unit 17 can make distribution such that the distribution amount of each of the disapproving rights holders is higher than the distribution amount of each of the approving rights holders at the time of at least the first vote for determining whether to permit the use. The payment processing unit 17 can make distribution such that the distribution amount of each of the disapproving rights holders relative to the distribution amount of each of the approving rights holders is small for each of the second vote and thereafter for determining whether to permit the use. In addition, the payment processing unit 17 may make distribution such that the distribution amount of each of the disapproving rights holders and the distribution amount of each of the approving rights holders are different at the time of at least the first vote for determining whether to permit the use. The payment processing unit 17 may make distribution such that the distribution amount of each of the approving rights holders is higher than the distribution amount of each of the disapproving rights holders, for example. This can promote the use of the content.

Figure 24:
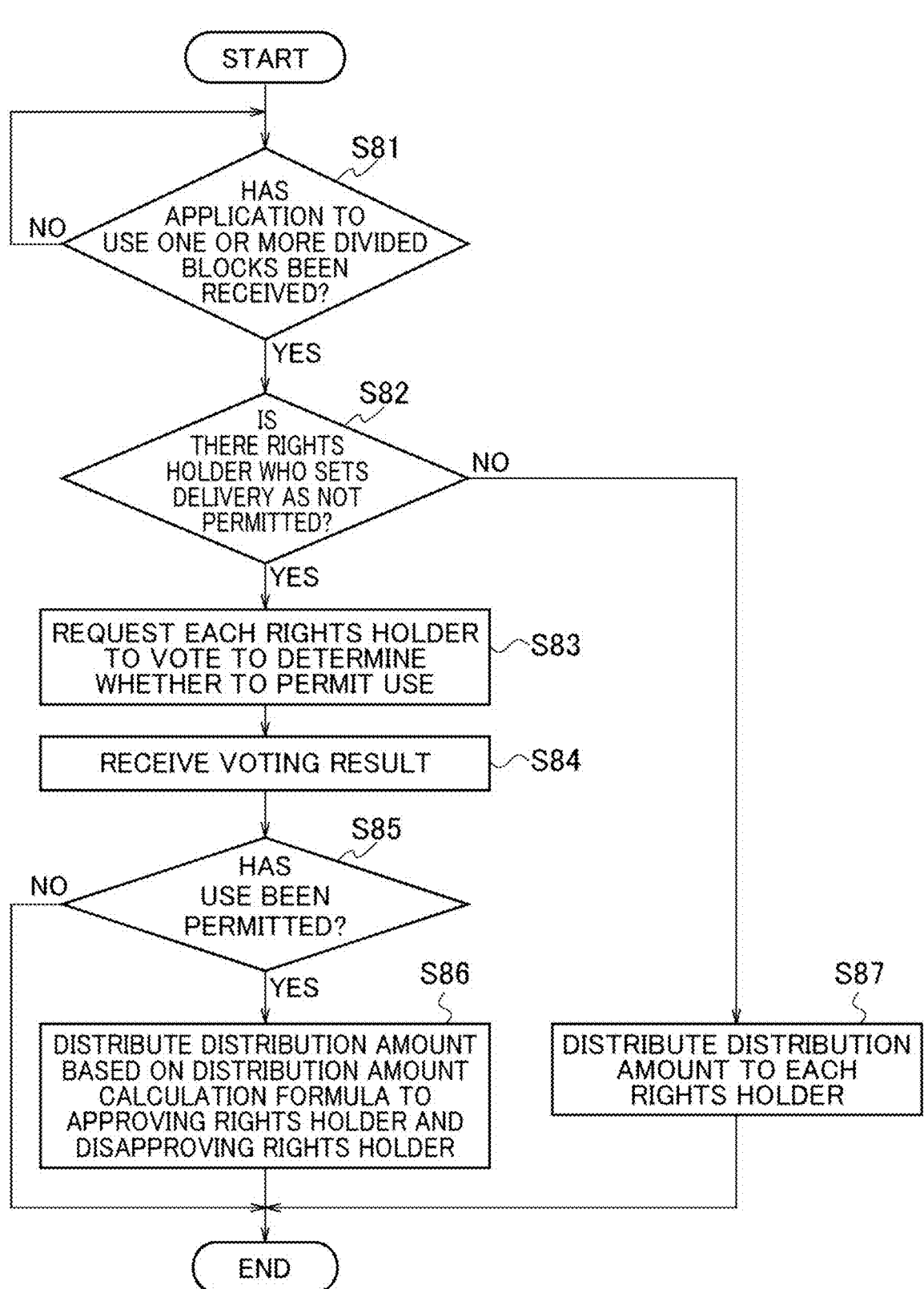
FIG. 24 is a flowchart illustrating an operation performed by the content asset management apparatus according to an eighth embodiment, a content asset management method according to an eighth embodiment, and processing that a content asset management program according to an eighth embodiment causes a computer to perform.

A description will be given with reference to a flowchart shown in FIG. 24 regarding an operation performed by the content asset management apparatus 1 and a content asset management method performed by the content asset management apparatus 1 when a user applies to use one or more divided blocks. The flowchart shown in FIG. 24 corresponds to processing that a content asset management program stored in the content asset management apparatus 1 causes a computer to perform.

A communication unit 10 determines whether an application to use one or more divided blocks has been received in step S81. If a communication unit 20 of a content delivery apparatus 2 has received an application to use one or more divided blocks, it is sufficient if the communication unit 20 notifies the communication unit 10 that the application has been received. An electronic ledger management unit 13 determines whether rights holders of the one or more divided blocks for which the user has applied to use include a rights holder who sets delivery as not permitted in step S82.

If there is no rights holder who sets delivery as not permitted (NO) in step S82, the payment processing unit 17 distributes the distribution amount based on the obtained usage fee to each rights holder, and the content asset management apparatus 1 ends the processing. The payment processing unit 17 may distribute the distribution amount to each rights holder equally, or may distribute the distribution amount according to an aggregation evaluation value of each divided block.

If there is a rights holder who sets delivery as not permitted (YES) in step S82, the notification unit 16 requests each rights holder to vote to determine whether to permit the use in step S83. The use permission/non-permission determination unit 18 receives a voting result from each rights holder in step S84. The use permission/non-permission determination unit 18 determines whether to permit the use, based on the voting result in step S85.

If the use is permitted (YES) in step S85, the payment processing unit 17 distributes the distribution amount based on distribution amount calculation formulas such as formulas (1) to (3) to the approving rights holders and the disapproving rights holders in step S86, and the content asset management apparatus 1 ends the processing. If the use is not permitted (NO) in step S85, the content asset management apparatus 1 ends the processing.

According to an eighth embodiment described above, since the use of the content is not restricted due to the intention of only very few rights holders who have set delivery as not permitted, it is possible to avoid lowering in an asset value of the content.

Ninth Embodiment

A ninth embodiment has features in a configuration and an operation of a content asset management apparatus 1 for evaluating an agent for representing a rights holder set for a rights holder of a divided block. Descriptions of common parts between a ninth embodiment and a first embodiment may be omitted. As shown in FIG. 25, a content management table managed by an electronic ledger management unit 13 records, for each divided block, a rights holder, an agent representing the rights holder, and an evaluation value (aggregation evaluation value) in association. There may be a case where no agent is set for rights holders of some divided blocks.

Figure 26:
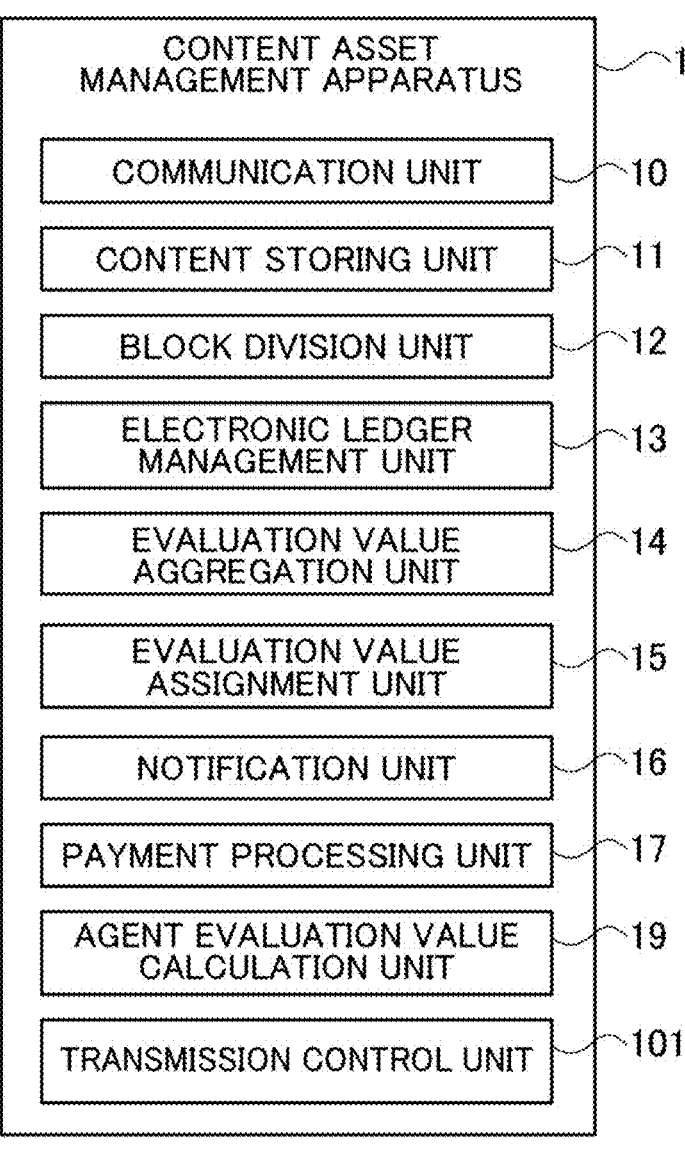
FIG. 26 is a block diagram illustrating a content asset management apparatus according to a ninth embodiment.

As shown in FIG. 26, the content asset management apparatus 1 according to a ninth embodiment includes an agent evaluation value calculation unit 19 and a transmission control unit 101 in addition to the configuration of the content asset management apparatus 1 shown in FIG. 1. The agent evaluation value calculation unit 19 calculates an agent evaluation value for each agent based on a ratio of a total evaluation value, which is the sum of evaluation values of one or more divided blocks managed for each agent set in the content management table, to the sum of evaluation values of all divided blocks included in content. That is, if there is an agent representing rights holders of all the divided blocks in the content, the agent has the largest agent evaluation value. The agent evaluation value calculation unit 19 calculates an agent evaluation value for each piece of content.

When a content storing unit 11 stores a plurality of pieces of content, the electronic ledger management unit 13 manages an electronic ledger including a content management table for each of the plurality of pieces of content. The agent evaluation value calculation unit 19 calculates a total agent evaluation value obtained by summing agent evaluation values calculated for each piece of content for each same agent for the plurality of pieces of content.

The agent evaluation value calculation unit 19 may generate ranking data by ranking total agent evaluation values for each agent. The transmission control unit 101 receives a request to transmit the ranking data from a third party and controls a communication unit 10 to transmit the ranking data to the third party.

The agent evaluation value calculation unit 19 can calculate an agent evaluation value based on formula (4), for example. Assuming that P1 is the sum of evaluation values of all or part of divided blocks in content K1, β is the occupancy ratio, which is the ratio of evaluation values of divided blocks managed by a certain agent D, to the sum P1, and power p of β has p>1, an agent evaluation value Dk1 of the certain agent D in the content K1 can be obtained based on formula (4). The occupancy ratio β is 0<β<1.

$$Dk1 = P1 * \beta^p \qquad (4)$$

The power p in formula (4) can be set to an appropriate value such as 1.00001, 1.2, or 2.0. If the power p is set to a large value, the agent evaluation value Dk1 becomes a value that is greatly affected by the occupancy ratio β.

The agent evaluation value calculation unit 19 can calculate a total agent evaluation value based on formula (5). Assuming that Dk2 is an agent evaluation value of the same agent D in content K2 and Dk3 is an agent evaluation value of the same agent D in content K3, a total agent evaluation value SUM(D) of the agent D can be obtained based on formula (5).

$$SUM(D) = Dk1 + Dk2 + Dk3 \dots \qquad (5)$$

A description will be given with reference to a flowchart shown in FIG. 27 regarding an operation performed by the content asset management apparatus 1 and a content asset management method performed by the content asset management apparatus 1 when an agent of a rights holder is set in a content management table. The flowchart shown in FIG. 27 corresponds to processing that a content asset management program stored in the content asset management apparatus 1 causes a computer to perform.

Figure 27:
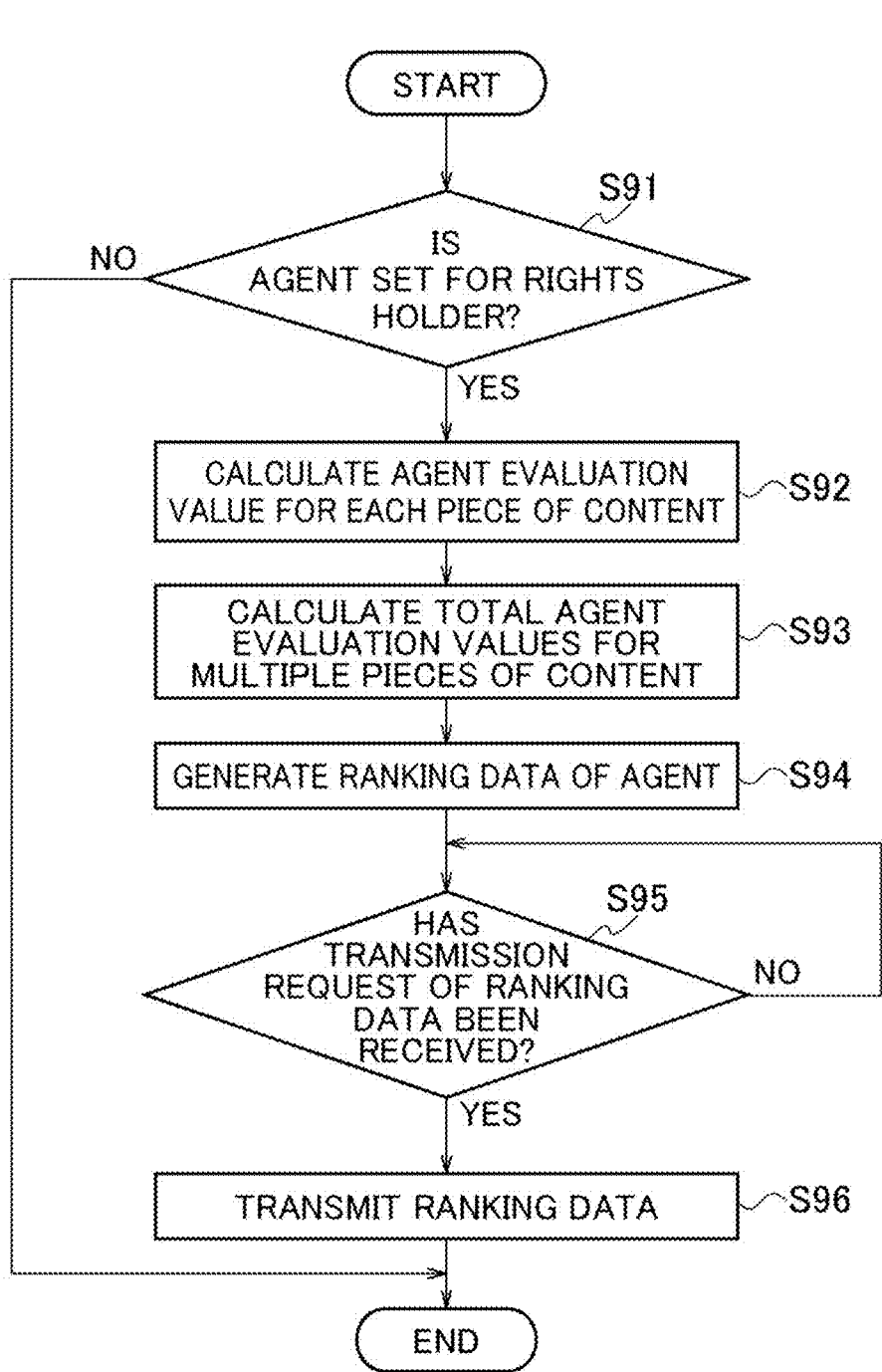
FIG. 27 is a flowchart illustrating an operation performed by the content asset management apparatus according to a ninth embodiment, a content asset management method according to a ninth embodiment, and processing that a content asset management program according to a ninth embodiment causes a computer to perform.

After processing starts in FIG. 27, the electronic ledger management unit 13 determines whether an agent is set for a rights holder in step S91. If no agent is set for a rights holder (NO), the content asset management apparatus 1 ends the processing. If an agent is set for a rights holder (YES), the agent evaluation value calculation unit 19 calculates an agent evaluation value for each piece of content in step S92. The agent evaluation value calculation unit 19 calculates total agent evaluation values for the plurality of pieces of content stored in the content storing unit 11 in step S93.

The agent evaluation value calculation unit 19 generates ranking data of an agent in step S94. The transmission control unit 101 determines whether a transmission request of the ranking data has been received in step S95. If the transmission request has not been received (NO), the transmission control unit 101 repeats the processing in step S95. If the transmission request has been received (YES), the transmission control unit 101 controls the communication unit 10 to transmit the ranking data to a transmission requester in step S96, and the content asset management apparatus 1 ends the processing.

The transmission control unit 101 may control the communication unit 10 to transmit a total agent evaluation value to the transmission requester. The transmission control unit 101 may control the communication unit to transmit a total agent evaluation value and ranking data to the transmission requester.

In a ninth embodiment, although the agent evaluation value calculation unit 19 calculates total agent evaluation values of the plurality of pieces of content stored in the content storing unit 11, the calculation target is not limited to the sum of the plurality of pieces of content and the agent evaluation value calculation unit 19 may calculate an average value of the agent evaluation values of the plurality of pieces of content (agent average evaluation value) for each agent, and generate ranking data obtained by performing ranking based on the average value. In this case, even if the number of pieces of content to be managed is small, an agent managing content having a high occupancy ratio is highly evaluated.

According to a ninth embodiment described above, a third party can grasp the ranking of an agent. In a ninth embodiment, ranking data of a rights holder may be generated in the same way that ranking data of an agent is generated.

Tenth Embodiment

A tenth embodiment has features in a configuration and an operation of a content asset management apparatus 1 for calculating the difficulty level of negotiation on content rights. Descriptions of common parts between a tenth embodiment and a first embodiment may be omitted. If there is a person who desires to receive transfer of rights of all divided blocks of certain content, knowing whether negotiation for receiving transfer of the rights is easy would be useful information for the person who desires to receive the transfer, for example.

Figure 28:
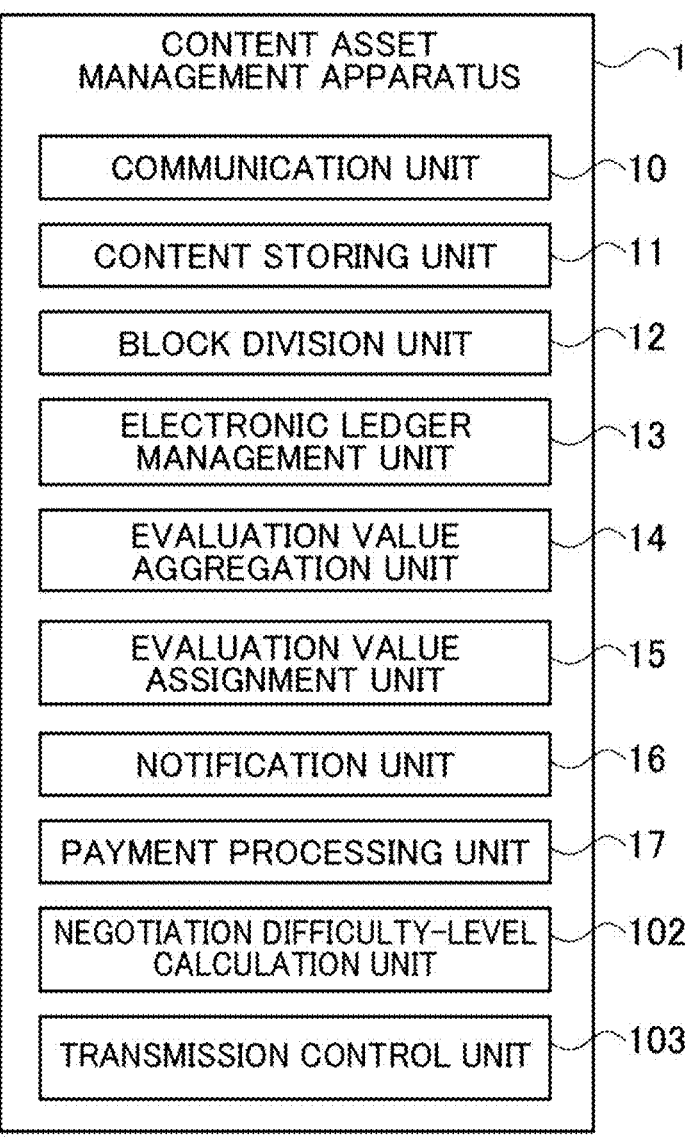
FIG. 28 is a block diagram illustrating a content asset management apparatus according to a tenth embodiment.

As shown in FIG. 28, the content asset management apparatus 1 according to a tenth embodiment includes a negotiation difficulty-level calculation unit 102 and a transmission control unit 103 in addition to the configuration of the content asset management apparatus 1 shown in FIG. 1. A content management table managed by an electronic ledger management unit 13 records, for each divided block, a rights holder, an agent representing the rights holder, and an evaluation value (aggregation evaluation value) in association, similar to that in FIG. 25.

The negotiation difficulty-level calculation unit 102 calculates the difficulty level of negotiation on the rights of each piece of content using at least one of the number of divided blocks of each piece of content, the number of rights holders, the sum of evaluation values (aggregation evaluation values), the variance of evaluation values (aggregation evaluation values), the number of agents, and the occupancy ratio $\beta$ of evaluation values for each agent relative to the sum of evaluation values. The transmission control unit 103 receives, from a third party, a request to transmit the difficulty level of negotiation on each of the plurality of pieces of content and controls a communication unit 10 to transmit the difficulty level of negotiation on each piece of content to the third party.

The negotiation difficulty-level calculation unit 102 can calculate the difficulty level of negotiation based on formula (7), for example. Formula (7) shows an example using the occupancy ratio $\beta$. Assuming that there are n agents D of D1, D2, . . . , and Dn for certain content, and that occupancy ratios $\beta$ of aggregation evaluation values of the n agents D are $\beta 1$, $\beta 2$, . . . , and $\beta n$, a negotiation difficulty level DN can be obtained based on formula (7).

$$DN = \beta 1^p + \beta 2^p + \ldots + \beta n^p \tag{7}$$

The power p of $\beta$ in formula (7) may be set to an appropriate value such as 1.00001, 1.2, or 2.0. If the power p is set to a large value, the negotiation difficulty level DN becomes a value that is greatly affected by the occupancy ratio $\beta$.

The smaller the number of the agents D of the content, the easier the negotiation for receiving transfer of the content rights. The negotiation difficulty level DN obtained based on formula (7) indicates that the larger the value, the easier the negotiation.

When a negotiation difficulty level DN is generated based on the number of divided blocks of each piece of content, the number of rights holders, or the number of agents, the negotiation difficulty level DN may indicate that the negotiation becomes easier when the number of divided blocks, the number of rights holders, or the number of agents is smaller. When a negotiation difficulty level DN is generated based on the sum or variance of evaluation values of each piece of content, the negotiation difficulty level DN may indicate that the negotiation becomes easier when the sum or variance of evaluation values is smaller.

A description will be given with reference to a flowchart shown in FIG. 29 regarding an operation performed by the content asset management apparatus 1 for calculating the difficulty level of negotiation and a content asset management method performed by the content asset management apparatus 1. The flowchart shown in FIG. 29 corresponds to processing that a content asset management program stored in the content asset management apparatus 1 causes a computer to perform.

Figure 29:
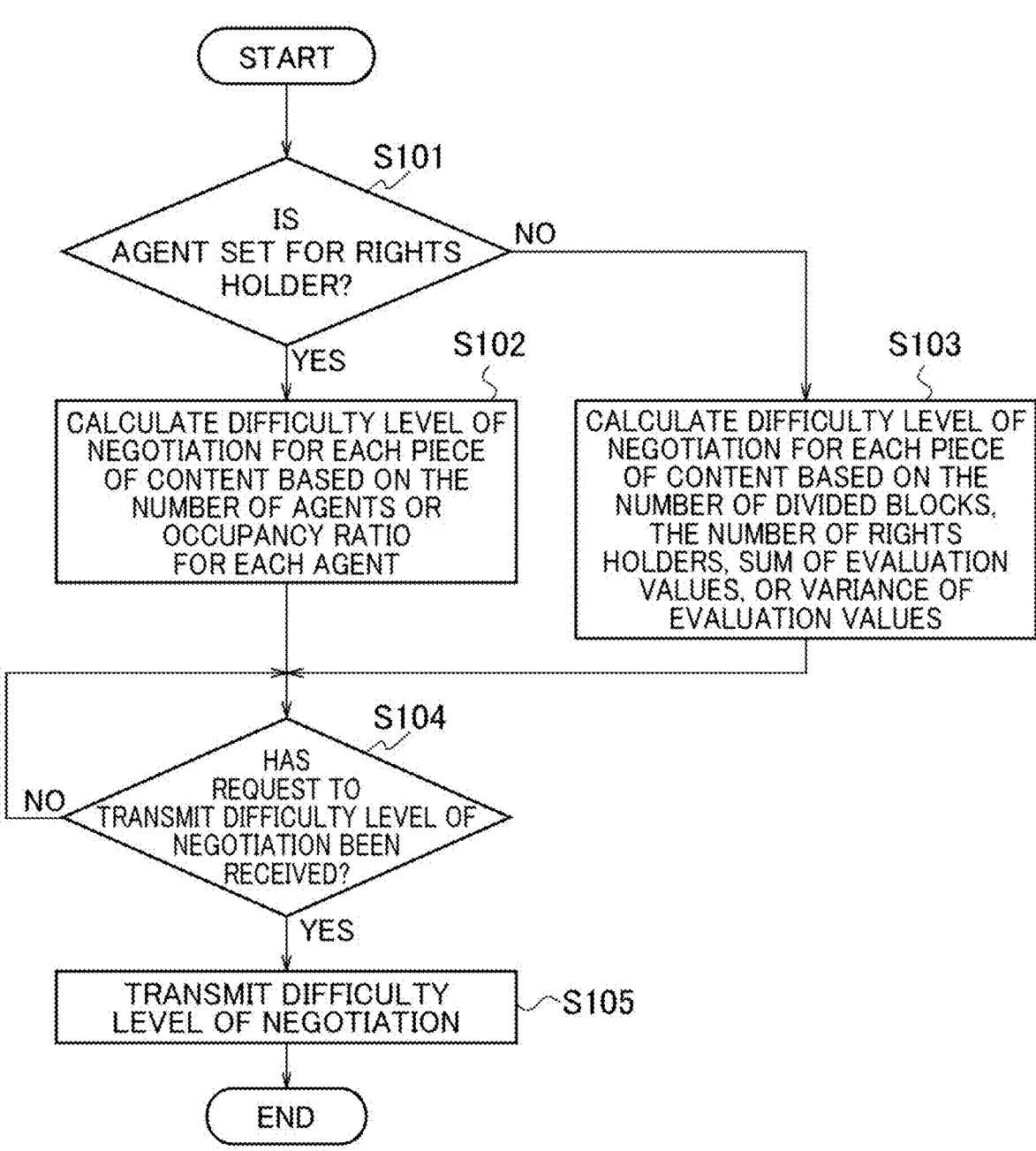
FIG. 29 is a flowchart illustrating an operation performed by the content asset management apparatus according to a tenth embodiment, a content asset management method according to a tenth embodiment, and processing that a content asset management program according to a tenth embodiment causes a computer to perform.

After processing starts in FIG. 29, the electronic ledger management unit 13 determines whether an agent is set for a rights holder in step S101. If an agent is set for a rights holder (YES), the negotiation difficulty-level calculation unit 102 calculates the difficulty level of negotiation for each piece of content based on the number of agents or an occupancy ratio for each agent in step S102. If no agent is set for a rights holder (NO), the negotiation difficulty-level calculation unit 102 calculates the difficulty level of negotiation for each piece of content based on the number of divided blocks, the number of rights holders, the sum of evaluation values, or the variance of evaluation values in step S103.

A transmission control unit 101 determines whether a request to transmit the difficulty level of negotiation has been received in step S104. If no transmission request has been received (NO), the transmission control unit 101 repeats the processing in step S104. Alternatively, if a transmission request has been received (YES), the transmission control unit 101 controls the communication unit 10 to transmit the difficulty level of negotiation to a transmission requester in step S105, and the content asset management apparatus 1 ends the processing.

According to a tenth embodiment described above, since a third party can grasp the difficulty level of negotiation of an agent, when the third party desires to receive transfer of rights to any content, the third party can select content for which the third party desires to receive transfer of right based on the difficulty level of negotiation.

The present invention is not limited to first to tenth embodiments described above, and various modifications are possible without deviating from the scope of the present invention. First to tenth embodiments may be optionally combined as long as no contradictions arise due to the combination.

What is claimed is:

1. A content delivery apparatus comprising:
a content acquisition unit configured to:
when an instruction to deliver a divided block having an evaluation value equal to or more than a predetermined threshold value is received from a user, extract, from a content asset management apparatus, one or more divided blocks having evaluation values equal to or more than the threshold value from among content in which each divided block, from a plurality of divided blocks obtained by dividing the content into a plurality of blocks, is associated with an evaluation value and is managed by the content asset management apparatus, and
acquire the extracted divided blocks as delivery data; and
a delivery control unit configured to, when the user pays a usage fee to receive the delivery of the extracted divided blocks, perform control to deliver the delivery data to a user terminal of the user,
the evaluation value is an aggregation evaluation value by aggregating evaluation values obtained by one or more evaluators evaluating one or more of the plurality of divided blocks for each divided block,
the content asset management apparatus manages auxiliary information indicating an evaluation time condition that is at least one of a season, a time of day, and a location when each evaluator of the one or more evaluators evaluates one or more divided blocks from the plurality of divided blocks, and the content asset management apparatus manages an aggregation evaluation value obtained by aggregating evaluation values for each evaluation time condition indicated by the auxiliary information as an evaluation value for each of the divided blocks, and
when the instruction to deliver the divided block having the evaluation value equal to or more than the threshold value is received from the user, the content acquisition unit is configured to extract the one or more divided blocks having the evaluation values equal to or more than the threshold value, based on the aggregation evaluation value for each evaluation time condition.

2. The content delivery apparatus according to claim 1, wherein
when an instruction to deliver a whole of the content is received from the user, the content acquisition unit acquires delivery data of the whole of the content from the content asset management apparatus, and when the user pays a usage fee to receive the delivery of the whole of the content, the delivery control unit delivers the delivery data of the whole of the content to the user terminal.

3. The content delivery apparatus according to claim 1, wherein
the content asset management apparatus manages a rights holder for each of the divided blocks,
the content delivery apparatus further comprising:
a data acquisition unit configured to, when an instruction to deliver the divided blocks or the content is received from the user, acquire data indicating a rights holder of each of the divided blocks from the content asset management apparatus, wherein
after the content acquisition unit acquires delivery data of two or more divided blocks, and the delivery control unit ends the delivery of the delivery data, the delivery control unit delivers information collectively indicating rights holders of the two or more divided blocks acquired by the data acquisition unit to the user terminal.

4. A content delivery apparatus comprising:
a data acquisition unit configured to, when an instruction to deliver content is received from a user, acquire data indicating whether the delivery is possible for each divided block, from a plurality of divided blocks obtained by dividing the content into a plurality of blocks, from a content asset management apparatus that manages the content;
a notification unit configured to, when the content includes a divided block which is not deliverable, notify the user that the content includes the divided block which is not deliverable and inquires the user whether the user allows to receive replacement delivery of content without the divided block which is not deliverable in which the divided block which is not deliverable is replaced with a similar divided block;
a content acquisition unit configured to acquire delivery data of a divided block without the divided block which is not deliverable from the content asset management apparatus; and
a delivery control unit configured to extract, from among the divided blocks which are deliverable of the content, a divided block similar to the divided block which is not deliverable, and to perform control to deliver the replacement delivery data acquired by the content acquisition unit in which the divided block which is not deliverable is replaced with the divided block similar to the divided block which is not deliverable to a user terminal of the user, when the user responds to the notification unit that the user allows to receive the replacement delivery of the content without the divided block which is not deliverable and the user pays a usage fee for receiving the replacement delivery of the content.

5. The content delivery apparatus according to claim 4, wherein
the content asset management apparatus manages an evaluation value for each of the divided blocks, and
the delivery control unit performs control to deliver combination content obtained by combining two or more divided blocks, based on an evaluation value of each divided block of the plurality of divided blocks.

6. A content delivery apparatus comprising:
a data acquisition unit configured to, when an instruction to deliver combination content is received from a user, the combination content being obtained by combining two or more divided blocks of a plurality of divided blocks obtained by dividing content into a plurality of blocks, acquire data indicating whether to permit combination with other divided blocks for each of the divided blocks from a content asset management apparatus that manages the content;

a content acquisition unit configured to acquire delivery data of the divided blocks of the combination content from the content asset management apparatus; and a delivery control unit configured to perform control to deliver the delivery data acquired by the content acquisition unit to a user terminal of the user, when all of the divided blocks included in the combination content are permitted to be combined with other divided blocks and the user pays a usage fee for receiving delivery of the combination content, wherein the content asset management apparatus manages auxiliary information indicating an evaluation time condition that is at least one of a season, a time of day, and a location when each evaluator of one or more evaluators evaluates one or more divided blocks from the plurality of divided blocks, and the content asset management apparatus manages an aggregation evaluation value obtained by aggregating evaluation values for each evaluation time condition indicated by the auxiliary information as an evaluation value for each of the divided blocks, and when an instruction to deliver a divided block having an evaluation value equal to or more than a predetermined threshold value is received from the user, the content acquisition unit is configured to extract one or more divided blocks having evaluation values equal to or more than the predetermined threshold value, based on the aggregation evaluation value for each evaluation time condition.

* * * * *